US011119920B2

(12) United States Patent
Ros et al.

(10) Patent No.: US 11,119,920 B2
(45) Date of Patent: Sep. 14, 2021

(54) SYSTEMS AND METHODS FOR NON-SPECULATIVE STORE COALESCING AND GENERATING ATOMIC WRITE SETS USING ADDRESS SUBSETS

(71) Applicant: ETA SCALE AB, Uppsala (SE)

(72) Inventors: Alberto Ros, Cartagena (ES); Stefanos Kaxiras, Uppsala (SE)

(73) Assignee: ETA SCALE AB, Uppsala (SE)

( * ) Notice: Subject to any disclaimer, the term of this patent is extended or adjusted under 35 U.S.C. 154(b) by 218 days.

(21) Appl. No.: 16/388,120

(22) Filed: Apr. 18, 2019

(65) Prior Publication Data
US 2019/0324905 A1    Oct. 24, 2019

Related U.S. Application Data

(60) Provisional application No. 62/659,774, filed on Apr. 19, 2018.

(51) Int. Cl.
*G06F 12/0806*    (2016.01)
*G06F 3/06*    (2006.01)

(52) U.S. Cl.
CPC ........ *G06F 12/0806* (2013.01); *G06F 3/0604* (2013.01); *G06F 3/0655* (2013.01); *G06F 3/0673* (2013.01); *G06F 2212/62* (2013.01)

(58) Field of Classification Search
CPC .... G06F 3/0604; G06F 3/0655; G06F 3/0673; G06F 12/126; G06F 2212/62
See application file for complete search history.

(56) References Cited

U.S. PATENT DOCUMENTS

| 2015/0046662 A1* | 2/2015 | Heinrich | G06F 12/00 711/151 |
| 2015/0302903 A1* | 10/2015 | Chaurasia | G06F 12/084 711/105 |

OTHER PUBLICATIONS

Agarwal et al., "GARNET: A Detailed On-Chip Network Model inside a Full-System Simulator," IEEE International Symposium on Performance Analysis of Systems and Software, ISPASS 1999, Apr. 26-28, 2009, Boston, MA, US.
Bienia et al., "The PARSEC Benchmark Suite: Characterization and Architectural Implications," PACT'08, Oct. 25-29, 2008, Toronto, Ontario, CA.
Carlson et al., "Sniper: Exploring the Level of Abstraction for Scalable and Accurate Parallel Multi-Core Simulation," SC'11, Nov. 12-18, 2011, Seattle, WA, US.
Ceze et al., "BulkSC: Bulk Enforcement of Sequential Consistency," ISCA'07, Jun. 9-13, 2007, San Diego, CA, US.
Coffman, Jr. et al., "System Deadlocks," Computing Surveys, Jun. 1971, vol. 3, No. 2.
Dijkstra, "Hierarchical Ordering of Sequential Processes," E.W. Dijkstra Archive, Center for American History, University of Texas at Austin, EWD310.

(Continued)

*Primary Examiner* — Aracelis Ruiz
(74) *Attorney, Agent, or Firm* — Patent Portfolio

(57) ABSTRACT

A method for performing store buffer coalescing in a multiprocessor computer system includes forming, in a coalescing store buffer associated with a core in said multiprocessor system, an atomic group of writes; and performing each individual write in said atomic group in an order which is a function of an address in a memory system to which each of the writes in said atomic group are being written.

16 Claims, 16 Drawing Sheets

(56) References Cited

OTHER PUBLICATIONS

Gharachorloo et al., "Two-Techniques to Enhance the Performance of Memory Consistency Models," Proceedings of the 1991 International Conference on Parallel Processing, Aug. 1991.
Gniady et al., "Is SC+ILP=RC?," Proceeding of the 26th International Symposium on Computer Architecture (ISCA 26), May 1-4, 1999, Atlanta, GA, US.
Gope et al., "Atomic SC for Simple In-order Processors," 2014 IEEE 20th International Symposium in High Performance Computer Architecture (HPCA), Feb. 15-19, 2014, Orlando, FL, US.
Hammond et al., "Transactional Memory Coherence and Consistency," Proceedings of the 31st Annual Symposium on Computer Architecture, ISCA '04, Jun. 19-23, 2004, Munich, DE.
Harris et al., "Transactional Memory," 2010, Morgan & Claypool Publishers.
Intel, "Intel® 64 and IA-32 Architectures Optimization Reference Manuel;" Apr. 2019.
Jouppi, "Cache Write Policies and Performance," Proceedings of the 20th Annual International Symposium on Computer Architecture, ISCA '93, May 16-19, 1993, San Diego, CA, US.
Lamport, "How to Make a Multiprocessor Computer That Correctly Executes Multiprocess Programs," IEEE Transactions on Computers, Sep. 1979, vol. c-28, No. 9.
Li et al., "CACTI-P: Architecture-Level Modeling for SRAM-based Structures with Advanced Leakage Reduction Techniques," 2011 IEEE/ACM International Conference on Computer-Aided Design (ICCAD), Nov. 7-10, 2011, San Jose, CA, US.
Lin et al., "Efficient Sequential Consistency via Conflict Ordering," ASPLOS'12, Mar. 3-7, 2012, London, England, UK.
Martin et al., "Multifacet's General Execution-driven Multiprocessor Simulator (GEMS) Toolset," Computer Architecture News (CAN), Sep. 2005, vol. 33, No. 4.
Moon et al., "Scalable Hardware Priority Queue Architectures for High-Speed Packet Switches," IEEE Transactions on Computers, Nov. 2000, vol. 49, No. 11.
Rajwar et al., "Transactional Lock-Free Execution of Lock-Based Programs," Proceedings of the Tenth International Conference on Architectural Support for Programming Languages and Operating Systems (ASPLOS), Oct. 6-9, 2002, San Jose, CA, US.
Ros et al., "Non-Speculative Load-Load Reordering in TSO," Proceedings of the 44th Annual International Symposium on Computer Architecture, ISCA'17, Jun. 24-28, 2017, Toronto, ON, CA.
Ros et al., "Racer: TSO Consistency via Race Detection," 49th Annual IEEE/ACM International Symposium on Microarchitecture (MICRO), Oct. 15-19, 2016, Taipei, TW.
Sewell et al., "x86-TSO: A Rigorous and Usable Programmers Model for x86 Multiprocessors," Communications of the ACM, Jul. 2010, vol. 53, No. 7.
Skadron et al., "Design Issues and Tradeoffs for Write Buffers," Proceedings of the Third International Symposium on High Performance Computer Architecture, Feb. 1-5, 1997, San Antonio, TX, US.
SPARC International, Inc., "The SPARC Architecture Manuel;" Version 9, 1994, PTR Prentice Hall.
Stone et al., "Multiple Reservations and the Oklahoma Update," IEEE Parallel & Distributed Technology, Nov. 1993, vol. 1, No. 4.
Tsuei et al., "Queuing Simulation Model for Multiprocessor Systems," IEEE Computer, Feb. 2003, vol. 36, No. 2.
Wenisch et al., "Mechanisms for Store-wait-free Multiprocessors," Proceedings of the 34th Annual International Symposium on Computer Architecture, ISCA'07, Jun. 9-13, 2007, San Diego, CA, US.

\* cited by examiner

Cachelines [words]
A : [a0]
B : [b0, b1, b2]
C : [c0, c1, c2]
D : [d0]
FIG. 5A
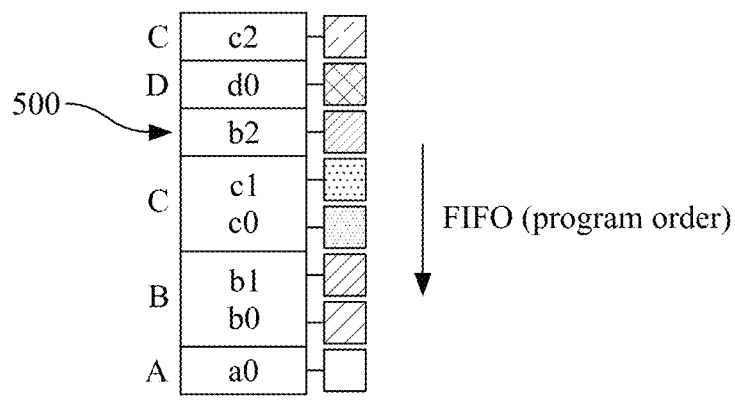
FIG. 5B
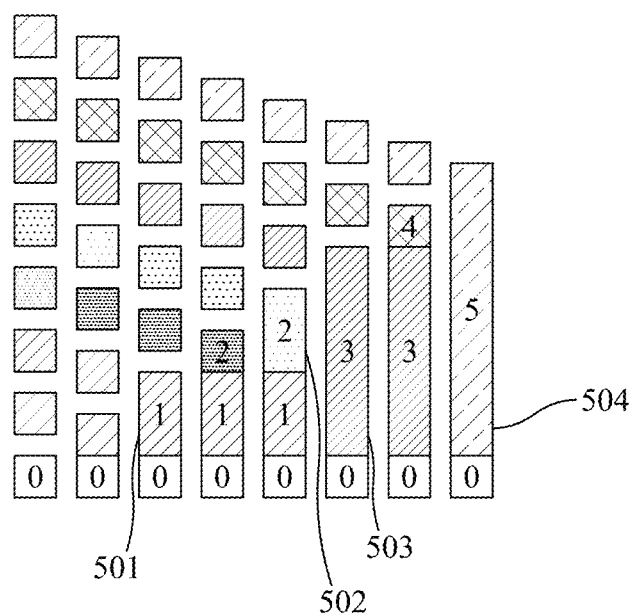
FIG. 5C

```
1:   foreach atomic-group (oldest to youngest) in the CSB do
2:     left_to_do = number of cachelines in atomic-group
3:     repeat
4:       min=0xFFFFFFFF
         // find the min
5:       foreach cacheline in the atomic-group {
6:         if (not completed)
7:           if (addr <= min) min=addr;
8:       }
         // write it and lock it
9:       {   write min;
             mark min ``completed'';
             lock L1 cacheline min }
10:      left_to_do --
11:    until left_to_do == 0
12:    unlock all cachelines
13: end foreach
```

FIG. 7

Load: assoc. search, all AG store:
assoc. search in latest AG write-out:
assoc search in oldest AG Load: assoc. (all AG) @ index
store: DM in latest AG write-out:
DM (traverse oldest AG)

SYSTEMS AND METHODS FOR NON-SPECULATIVE STORE COALESCING AND GENERATING ATOMIC WRITE SETS USING ADDRESS SUBSETS

RELATED APPLICATION

The present application is related to, and claims priority from, U.S. Provisional Patent Application No. 62/659,774 filed on Apr. 19, 2018, entitled "SYSTEM AND METHOD FOR NON-SPECULATIVE STORE COALESCING" to Alberto Ros and Stefanos Kaxiras, the disclosure of which is incorporated herein by reference.

TECHNICAL FIELD

Embodiments described herein relate in general to store buffers in multiprocessor systems and, more particularly, to a novel approach of performing non-speculative store coalescing using store buffers.

BACKGROUND

Store buffers are indispensable in multiprocessor computing systems to improve such systems' performance by allowing the immediate retirement of store instructions from the pipeline and handling long-latency writes off of the critical path of execution. That is execution of a program can continue semi-independently of writing results back to memory, as long as certain rules (memory consistency model) are adhered to.

Consistency models used in such multiprocessor computing systems are memory model rule sets which enable the results of reading data from, and writing data to, memory to be consistent and predictable. One way consistency models can be defined is as a set of rules that define the order in which program operations that access memory, for example load, store, and atomic instructions, appear to be performed in memory. A consistency model may define for example that the program order between load and store instructions must appear to be preserved when these instructions are performed in memory. This particular rule is denoted as load→store. The existence of a store buffer in a system affects the enforcement of consistency rules. Various consistency models accommodate store buffers in different ways. Sequential consistency (SC) is a consistency model which demands strict memory ordering (all program order between memory access instructions must appear to be preserved in memory), and does not easily accommodate a store buffer except with extensive speculation. A system implementing SC at least appears to execute memory operations one at a time and in program order. Implementing a system's memory accesses in strict accordance with SC constraints negatively impacts performance in multiprocessor systems due to long latencies in shard memory multiprocessor systems. Accordingly, some systems have implemented SC-compliant regimes which speculatively relax memory order operations by buffering the history of the processor and memory state. If, however, one processor attempts to access memory which has been accessed out of program order by another processor, then the system uses the buffered history to roll back to an SC-compliant state.

In contrast to SC, total store order (TSO), implemented as e.g., SPARC TSO, TSOx86, in various processors, is a consistency model which relaxes ordering from stores to subsequent loads (i.e., relaxes the store→load order, but maintains the load→load, store→store, and load→store orders) specifically to accommodate store buffers. Weak memory models such as release consistency (RC) do an even better job of accommodating store buffers by relaxing all orders except across synchronization.

One of the important benefits of relaxing the store→store order in memory models is that multiprocessor systems with shared memory can then "coalesce" (i.e., combine write) non-consecutive store operations to the same cache block (cacheline). Coalescing alleviates store buffer capacity pressure and reduces the number of writes in the level one (L1) cache memory.

There is ample opportunity for coalescing in multiprocessor computing systems due to the spatial locality and the burstiness of stores. FIG. 1 shows the cumulative coalescing as a function of the number of store operations in a window that allows unrestricted coalescing of stores. With just the eight most recent stores in the window, PARSEC applications (the names of the individual PARSEC applications appear in the rectangle in FIG. 1) achieve a significant portion of their potential for coalescing.

However, the benefits of coalescing are not easily available in multiprocessor computing systems which use memory models where the store—store order must be enforced, for example, the TSO consistency model. This is the case because coalescing irreversibly changes the order of stores and violates TSO if such systems allow partial state to become visible to the memory system. In the Detailed description below detailed examples of how coalescing violates TSO with respect to conflicting loads and to conflicting stores are provided.

Thus, in systems using TSO, the store order must appear to be maintained even when coalescing is taking place. Out-of-core speculation can provide this illusion, as in systems employing SC, but this may be impractical in high-efficiency designs that avoid speculation outside the core, or when invasive changes to the memory hierarchy are not an option. Since these situations are common in industry, a non-speculative solution is needed.

One solution for the problem of enabling coalescing in multiprocessor systems employing the TSO model is to write all of the stores which are engulfed by coalescing for a given core atomically with respect to conflicting stores from other cores. However, to do this requires locking all of the cachelines in the atomic group prior to writing those cachelines, which can frequently result in deadlock situations. The deadlock problem of getting the permissions (locks) for a group of stores has been addressed before in two ways: i) by mutual exclusion on a centralized resource for the group write (e.g., broadcasting in the network, or obtaining permission for the whole group from an arbiter); or ii) by speculation-and-rollback as a generalization of load-linked/store-conditional. However, there is no known solution to this problem that does not involve a centralized resource, or speculation-and-rollback.

Accordingly, it would be desirable to provide systems and methods for non-speculative store coalescing in multiprocessor computing systems.

SUMMARY

According to an embodiment, a multiprocessor system includes multiple processor cores; a memory system; and multiple coalescing store buffers, each associated with a respective one of the multiple processor cores, for receiving store instructions from a respective processor core with store data to be written into said memory system; wherein the store data are coalesced in blocks that correspond to a multitude of consecutive memory locations; wherein a block written in the memory system, updates memory locations that correspond to memory locations of the store instructions that coalesced in said block with the corresponding store data; wherein said multiple coalescing store buffers each form atomic groups of said store instructions by writing the resulting coalesced data blocks as an atomic group; wherein each block within an atomic group is written to the memory system in an order which is a function of an address in the memory system to which that block is written.

According to an embodiment, a method for performing store buffer coalescing in a multiprocessor computer system includes forming, in a coalescing store buffer associated with a core in said multiprocessor system, an atomic group of writes; and performing each individual write in said atomic group in an order which is a function of an address in a memory system to which each of the writes in said atomic group are being written.

According to an embodiment, a method for performing a group of write instructions in a multiprocessor system includes: grouping a plurality of store instructions together; and writing each of the write instructions to a memory system in said multiprocessor system in an order which is a function of a portion of the memory address to which the store instruction writes.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A-5C depict the formation of atomic groups in a multiprocessor system;

FIG. 7 is pseudocode which illustrates how cachelines in atomic groups can be written and locked according to an embodiment;

DETAILED DESCRIPTION

Figure 1:
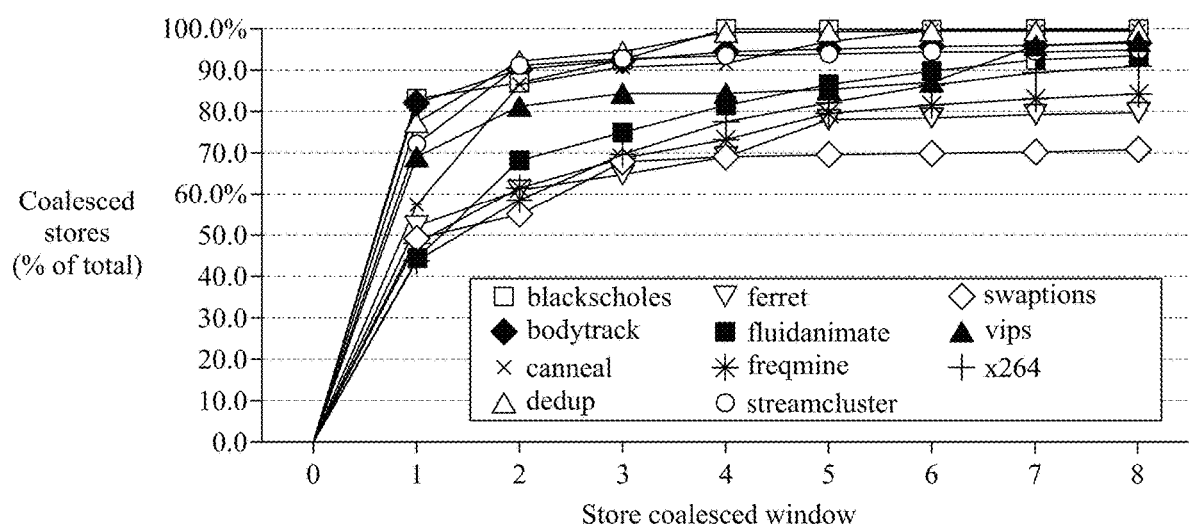
FIG. 1 shows the cumulative coalescing as a function of the number of store operations for a number of different systems.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of multiprocessor or multicore systems and structures. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Embodiments described below provide for, among other things, systems and methods for multiprocessor computing systems that impose an order, which is globally agreed to in the system, for the store buffers to write their data blocks. A typical data block is the cache block (cacheline). Herein, data blocks are referred to as cachelines, however, without restricting generality. An order, globally agreed to in the system, for the store buffers to write their cachelines, is referred to herein as lexicographical order. The lexicographical order is sometimes referred to herein as "lex order" for short. A lexicographical order for a cacheline is a function of the memory address of the cacheline or a function of a portion of the cacheline's address. Once an atomic group is formed for writing (i.e., due to coalescing), systems and methods designed in accordance with these embodiments write the atomic group's cachelines one-by-one in their lex order.

More specifically, according to these embodiments, each cacheline is written immediately if the corresponding write permission is already held (or if the corresponding write permission can be acquired) by one of the store buffers. This means that a conflicting atomic group associated with another store buffer can steal the write permission for a cacheline that has not been written yet. In that case, the "winning" store buffer (i.e., the store buffer that gets the permission first) takes priority to finish its writes before the "losing" store buffer is permitted to perform its write(s). Throughout the atomic group write and until it is finished, a store buffer holds on to the permissions after writing a cacheline (by locking it in the L1 cache). This serves a dual purpose: it provides atomicity among conflicting groups and delays any conflicting load from seeing partial group writes. Because of the lex order imposed by these embodiments it is guaranteed that the two conflicting groups will appear atomic with respect to each other without getting into a deadlock condition.

Figure 2:
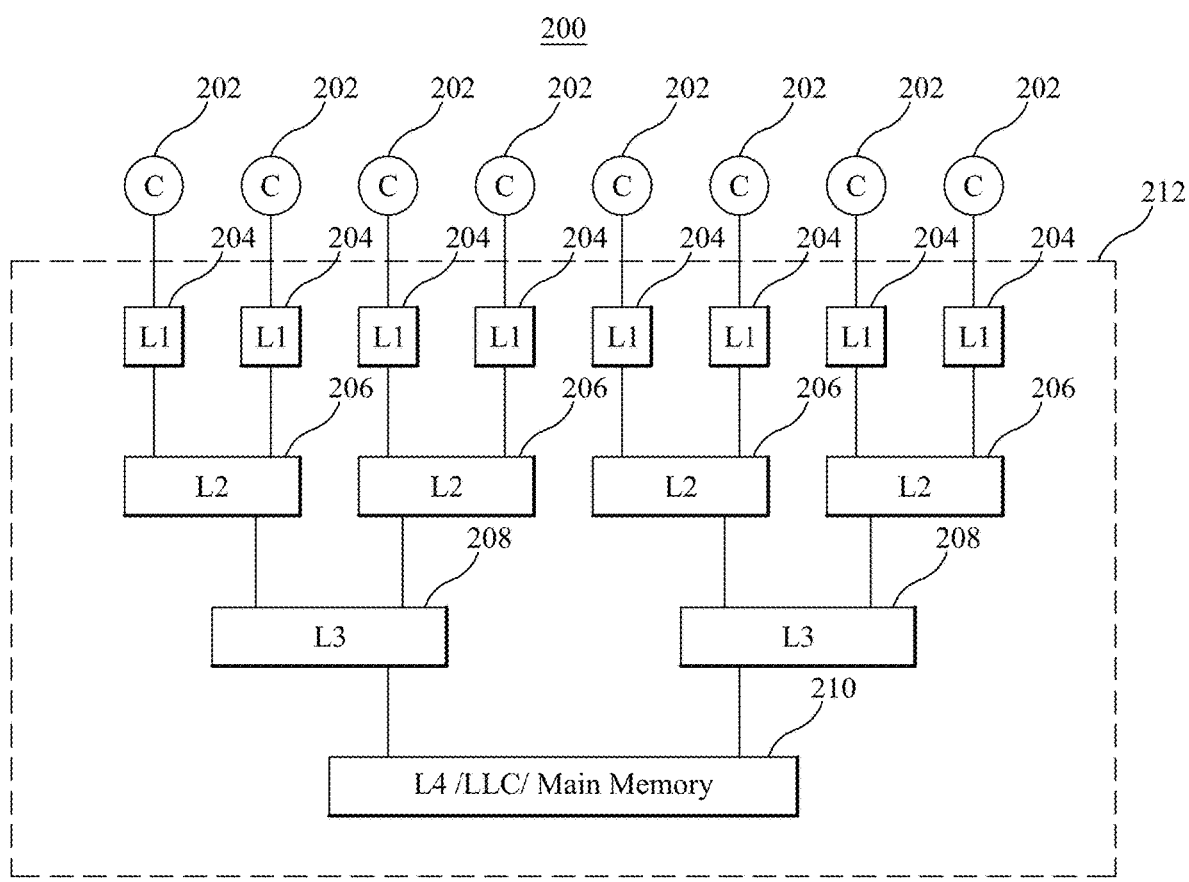
FIG. 2 illustrates a multiprocessor system.

Prior to describing these embodiments in more detail, a multiprocessor computing system having a shared memory hierarchy is described for context with respect to FIG. 2. Therein the multiprocessor system 200 includes multiple processor cores 202, each of which may be associated with and coupled to, one level (L1), or more levels (not shown) or private cache memory 204. The L1 caches 204 may be, in turn, associated with and coupled to, one or more levels (L2, L3) of shared caches 206, 208, which are themselves coupled to a higher level memory 210 which can be referred to as a level 4 (L4) cache, a last level cache (LLC) or main memory. All of the caches or memory 204, 206, 208 and 210

(which are collectively referred to herein at times as simply the "memory system" 212) are configured to and capable of storing one or more cache lines of data (or more generally "data blocks"), and the cores 202 can access data blocks stored in caches 202, 204, 206, 208 and 210 to which they are connected. All of the elements shown in FIG. 2 are interconnected in the manner shown by some form of network interconnect as will be appreciated by those skilled in the art. Those skilled in the art will further appreciate that the computer architecture illustrated in FIG. 2 is purely exemplary and that the embodiments can be implemented in different architectures than the one illustrated therein.

Figure 3:
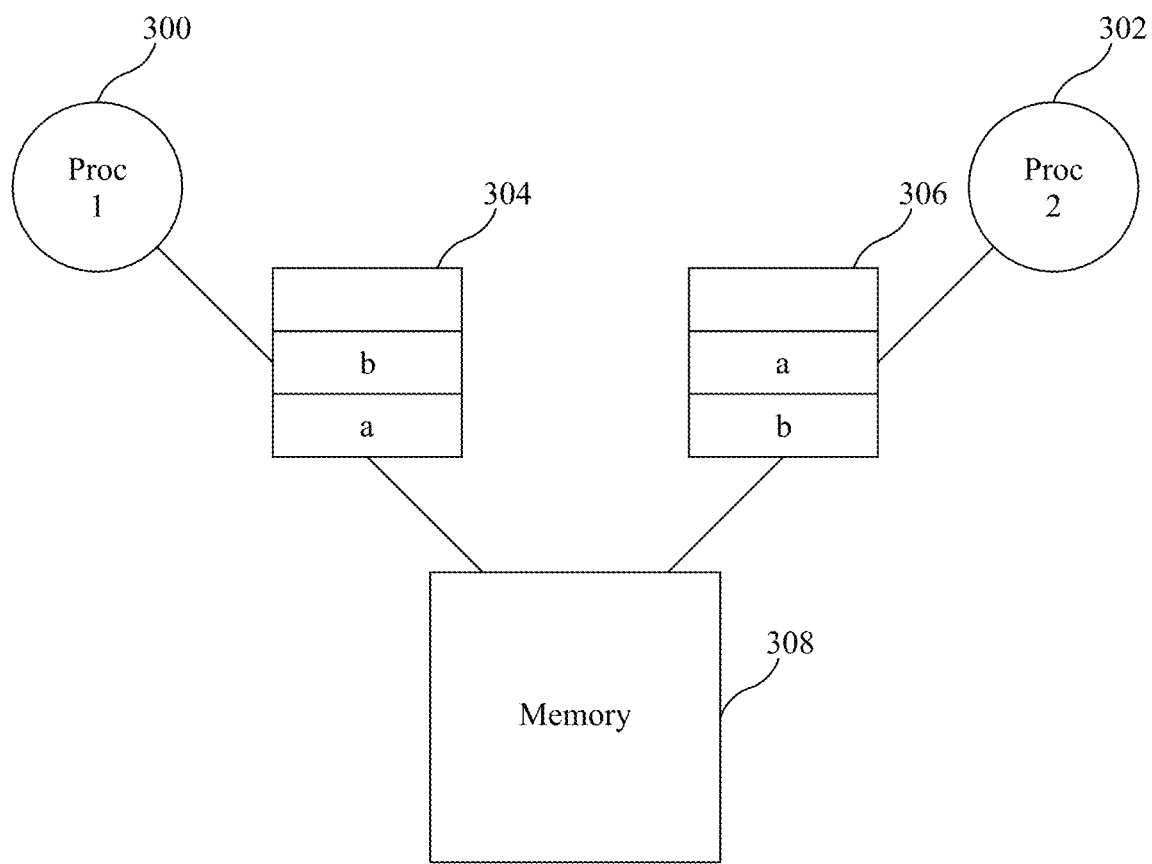
FIG. 3 shows another multiprocessor system wherein each core has an associated store buffer.

A significant component of some multiprocessor computing systems which is not illustrated in FIG. 2 are store buffers, which were discussed briefly in the Background section. FIG. 3 shows an example where two processors 300 and 302 (e.g., any two of the cores 202 in FIG. 2) each have their own store buffer 304 and 306, respectively. The store buffers 304 and 306 act as an interface between the cores 300 and 302 and the memory system 308, e.g., such as memory system 212 described above. When a store commits in the multiprocessor system, e.g., data block "a" shown in store buffer 304, the data associated with that store instruction is taken out of a processor's store queue (not shown) and inserted into the respective store buffer. As will be appreciated by those skilled in the art, a store that leaves the store queue cannot be undone, i.e., it must be written to memory 308. Regardless of whether the store queue and the store buffer are implemented separately or combined into a single structure, the store buffer is the structure that contains committed stores and sits in the interface between the core and the memory system.

Now consider the role of store buffers in the context of the TSO memory consistency model described above. Those skilled in the art will appreciate that the TSO is purely exemplary and that the embodiments described herein can be implemented in different memory models, or more generally in any situation when or where the store→store order must be enforced. The store buffers 304, 306 in a multiprocessor system implementing the TSO memory consistency model are responsible for enforcing two policies. The first policy is that stores are performed in the memory system in their program order. In this context, a store is "performed" when it exits the store buffer 304, 306 and is written into the memory system 308. The second policy is that a load from the same core 300 or 302 receives its value from the newest (in program order) store on the same address, if such a store exists in the store buffer 304, 306.

These two policies can be satisfied by implementing the store buffer as a single FIFO queue structure that can be searched associatively. Committed stores are placed in the FIFO queue structure and loaded to the memory system 308 on a first-in-first-out basis (i.e., in program order). Loads, in their critical path, search this structure associatively and select the latest entry if more than one match exists. More details regarding store buffer structures which can be used with the embodiments discussed herein are provided below with respect to the discussion of FIGS. 14A-14C.

Multiprocessor systems implementing the TSO memory consistency model hide the store latency that this model introduces by allowing loads to bypass stores in the store buffer. To make the most out of this, write permissions from the coherence protocol should be prefetched as soon as possible. Store prefetching can start as soon as the store is executed or as soon as it is committed. The embodiments described below can prefetch permissions at any point in time. For example, in one embodiment, a multiprocessor system and method prefetch permissions on commit to avoid possibly useless prefetching for speculative stores.

With this multiprocessor context in mind, the discussion next turns to a more detailed analysis of the problem posed by using the coalescing technique to combine stores (writes) to memory from the store buffer in multiprocessor systems employing the TSO model. FIGS. 4A-4D illustrate the problem. Assume that the multiprocessor system is executing the code snippets 400 and 402 illustrated in FIG. 4A using two cores (Core0 and Core 1). The TSO consistency model forbids a result wherein b==0 and a==1 after this code is executed since executing the program code 400 or 402 in program order from either Core0 or Core 1 will not yield this result (i.e., any future loads that access cacheline data blocks a and b should not be able to see this combination of values).

Figure 4A:
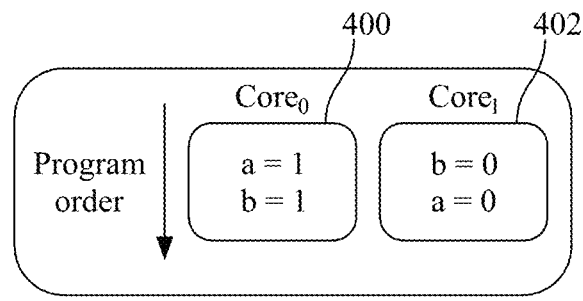
FIGS. 4A-4D illustrate how coalescing can violate total store order (TSO) in a multiprocessor system.
Figure 4B:
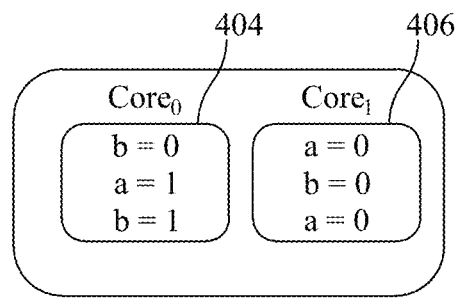
Figure 4C:
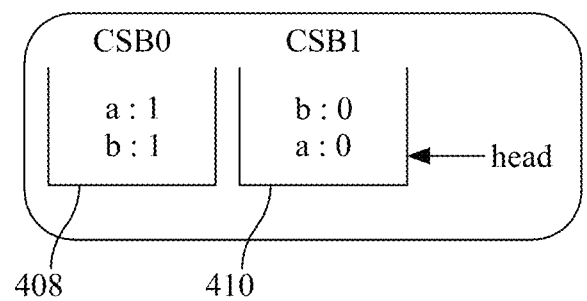

However, multiprocessor systems can easily produce this TSO violating result using a CSB that writes one store-buffer entry at a time (i.e., cacheline granularity). To see how this can occur, assume that the code snippets 400 and 402 of FIG. 4A are expanded to include two more stores (b=0 in Core0 and a=0 in Core1) as shown in code snippets 404 and 406 FIG. 4B. The newly added stores do not change the outcome of the code in terms of the values written to cachelines a and b, but do provide an opportunity for the CSBs 408 and 410, associated with Core0 and Core1, respectively, to coalesce the stores to the common cachelines, i.e., CSB 400 will coalesce the stores to cacheline b and CSB 402 will coalesce the stores to cacheline a as shown in FIG. 4C. Note, however, in FIG. 4C that the order in which the stores are written is no longer the program order, i.e., CSB 408 has coalesced the write the b=0 and b=1 writes into a single b:1 write and placed it ahead of the write to cacheline a due to the presence of b=0 being the first instruction to execute in code snippet 404 (whereas the program order has a=1 ahead of b=1 in code snippet 404). Similarly, CSB 410 has coalesced the writes to cacheline a and moved the a:0 write to the head of the buffer ahead of the write b:0, even though in the program order shown in snippet 406, b=0 executes before a=0.

Figure 4D:
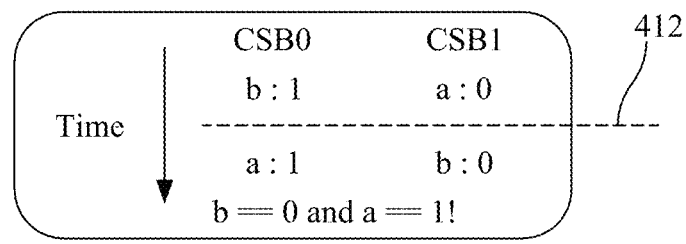

Assume now that the CSBs 408 and 410 in Core0 and in Core1 output their writes in the order shown in FIG. 4D. This results, at the point in time denoted by dotted line 412, in the set of values b==0 and a==1 being visible in the memory system to other cores, which condition is illegal in multiprocessor systems employing TSO, since these values should not occur if the stores are executed in the program order. As noted above, the reason why this violation occurs is because the coalescing of b in Core0, changes the order in which cachelines a and b are written by CSB0; analogously, coalescing of a in Core1 changes the order in which cachelines a and b are written by CSB1.

One solution to this problem is to write all the stores that are combined by coalescing atomically with respect to conflicting stores from other cores. As those skilled in the art will understand, "atomicity" in this context refers to a characteristic of a set of operations being indivisible and irreducible. For example, an operation acting on shared memory is atomic if that operation completes in a single step relative to other threads. A discussion regarding how atomic groups are formed because of coalescing will be useful in understanding the embodiments described herein.

Consider FIGS. 5A-5C. In FIG. 5A, a group of four cachelines A, B, C, D and the particular words within those cachelines which will be written to a0, b0, b1, b2, c0, c1, c2 and d0. In FIG. 5B, a store buffer 500 holds those writes in program order. FIG. 5C shows three cases of coalescing.

Cases 501 and 502 show the simple case where consecutive stores coalesce in the same cacheline. In 501 the writes on words b0 and b1 coalesce in cacheline B. In 502 the writes on words c0 and c1 coalesce in cacheline C. Case 503 shows the case where a number of stores are engulfed by a pair of coalescing stores (b2 and b0) at the endpoints: b2, c1, c0, b1, and b0 all become part of the same atomic group. Case 504 shows the slightly more complicated case of chained engulfment. Here two pairs of coalesced stores (b2, b0 and c2, c0) are interleaved and merge their atomic groups into one.

The method to form atomic groups in any of the three cases that are discussed in the previous paragraph is as follows: each store is tagged (numbered) with a new atomic group ID (agID) when entering the CSB. Only as many agIDs as the size of the CSB are needed. If a new store coalesces with a previous store of some agID the new store forces its agID to all the engulfed atomic groups between itself and the coalescing atomic group, inclusive. Each atomic group is written in agID order with respect to other atomic groups. Cachelines within an atomic group, however, can be written in any (non-deadlocking) order. The decision on when to start writing an atomic group is an implementation option and is discussed separately below. Additionally, as will become apparent from the following discussion, embodiments described herein can impose an additional constraint on how atomic groups are formed to further resolve certain forms of memory storage conflicts.

With this discussion of how atomic groups are formed in mind, the discussion returns to how to solve the problem posted by coalescing and the storage of atomic stores posed above with respect to FIGS. 4A-4D. When an atomic store is performed on a shared variable, no other thread can observe the modification half-complete. Thus the procedure of writing all stores that are combined by coalescing atomically means that Core0 should write a and b as an atomic group (since a is enclosed by the coalescing of b) and Core1 should also write a and b atomically (since b is enclosed by the coalescing of a).

While this solution initially cures the violation of TSO described above with respect to FIGS. 4A-4D, it causes other problems. For example, assume that Core0 will attempt to get the write permissions for both b and a before outputting its writes in order to provide the desired atomicity. Similarly Core1 will attempt to get both the write permissions for a and b. Core0 gets the permission for b first and Core1 gets the permission for a first: this leads to deadlock, or livelock i.e., the situation where two computer programs sharing the same resource are effectively preventing each other from accessing the resource, resulting in both programs ceasing to function (deadlock) or resulting in the states of both programs constantly changing with regard to one another, and none of the programs progressing (livelock). Without a mechanism to guarantee freedom from deadlock and livelock, the coalescing of non-consecutive stores cannot be done for TSO using conventional techniques.

According to embodiments described below, methods and systems solve the problems described above which are associated with coalescing store buffers in multiprocessor systems using TSO while also avoiding the deadlock/livelock problem of getting permissions for a group of stores without speculation and rollback. A first aspect of these embodiments is based on the observation that in an atomic group write (such as those generated by coalescing store buffers) multiprocessor systems do not have to follow any particular program order for the writes in the atomic group. Instead, the embodiments described herein select another order which avoids the deadlock condition. This other order for performing writes in an atomic group is referred to herein as the "lexicographical order" or "lex order", for short. In its broadest sense, the lexicographical order can be considered to be any order other than the program order for performing writes within an atomic group which avoids deadlock (and/or livelock). Several examples will now be provided of lex orders according to various embodiments.

Figure 6A:
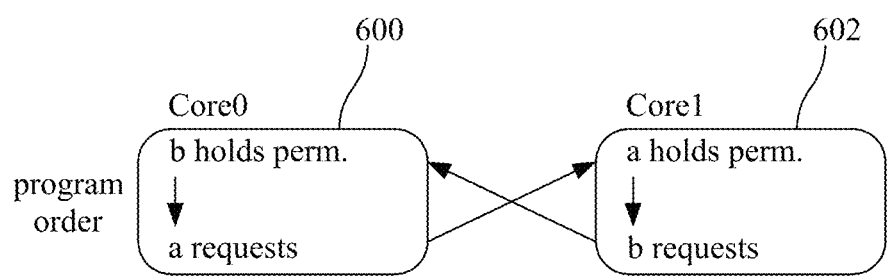
FIG. 6A illustrates how deadlock occurs in a multiprocessor system when loads are performed in program order and FIG. 6B illustrates how deadlock is avoided when those same loads are performed in address order.

As shown in FIG. 6A, which depicts the same program code snippet operations as those illustrated in FIG. 4A, Core0 600 attempts to write {b, a} at the same time as Core1 602 attempts to write {a, b}. In each store buffer, the order a and b are written follows the order in which they were allocated in the store buffers. The allocation, in turn, is the result of the program order in the respective cores. As we have seen, this program order creates a cycle (i.e., deadlock condition) as shown in FIG. 6A.

Figure 6B:
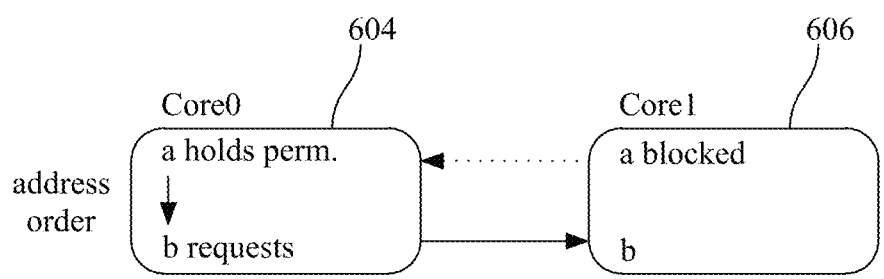

Instead, as shown in FIG. 6B, observe the memory operations as they progress when the atomic group writes are performed in a non-program, lexicographical order. In this example, the lexicographical order which is chosen is the address order of the writes, i.e., the numerical memory address to which the writes are directed in the memory system. In this example, cachelines are written in ascending order of their address. However, the embodiments described herein are not limited to lex orders which follow ascending address order. In general, the lex order can be any order that is a function of the address. For example, if function f gives the order then some examples of alternative lex orders can be: f(address)=address; f(address)=-address; f(address)=CONSTANT-address: f(address)=SubPart(address) where SubPart is a function that takes a subset of the bits of an address in some desired order and forms a new binary number. The usefulness of using SubPart(address) type lex orders according to some embodiments is described in more detail below.

In the particular example of FIG. 6B, CSB0 (Core 0) 604 writes cacheline a first, and will not release cacheline a until it finishes writing all of the writes in its atomic group. This means that CSB1 (Core1) 606 will have to wait to write cacheline a and, since according to this embodiment CSB1 606 must write in ascending address order (noting that the address of cacheline a has a lower value than the address of cacheline b) CSB1 606 cannot write (and hold on to) cacheline b either (which would have been the cause of the deadlock. Even if CSB1 (Core 1) 606 currently has the permissions for cacheline b, it relinquishes those permissions to CSB0 604 upon request.

A method for performing address order writes within an atomic group can be performed according to an embodiment using the pseudocode illustrated in FIG. 7. More specifically, FIG. 7 generalizes the above example for an arbitrary number of store buffers, each containing an arbitrary number of atomic groups, each consisting of an arbitrary set of cachelines. The code operates as follows. Each coalescing store buffer writes its atomic groups in order (oldest to youngest). The main part of the method (lines 2 to 12) writes an atomic group. Among the cachelines of an atomic group that have not been written yet, the method selects the one with lowest (min) address. Starting at line 9, the L1 cache is accessed and, if the corresponding cacheline has write permissions, the store buffer writes its updates to that cacheline immediately. This embodiment refers to cacheline writes as "updates" because most of the time only part of the cacheline changes in the store buffer: thus the updated bytes are merged with bytes which are not updated in the cacheline in the L1. If the store buffer or corresponding core does not have the proper permissions to write to this cacheline (or it is a miss in the cache), a request for the permissions is sent and the store buffer waits for the completion of the request. When the store buffer receives the needed permissions, it will resume writing to this cacheline. When the write succeeds, the cacheline is locked in the L1—using an extra bit per cacheline—and marked as "completed" in the store buffer.

According to an embodiment, a locked L1 cacheline does not relinquish its permissions to an external write request nor does it allow reads. Instead, it delays both external read and external write requests until the lock is removed. Note that according to some embodiments, there can be only one blocked external read or external write request per cacheline, in a system with a blocking directory (e.g., as in the GEMS implementation). Since conflicts can happen only for an ongoing atomic group write, the buffering space for delayed requests is bounded by the size of the atomic group in the store buffer, and thus poses no threat for deadlocks or livelocks due to overflow.

All the lock bits are reset in bulk when the atomic group write completes all of its writes to the L1. Delayed read and write requests are satisfied at this point, before a new atomic group write is started, ensuring forward progress for stalled atomic group writes of remote CSBs.

Figure 8:
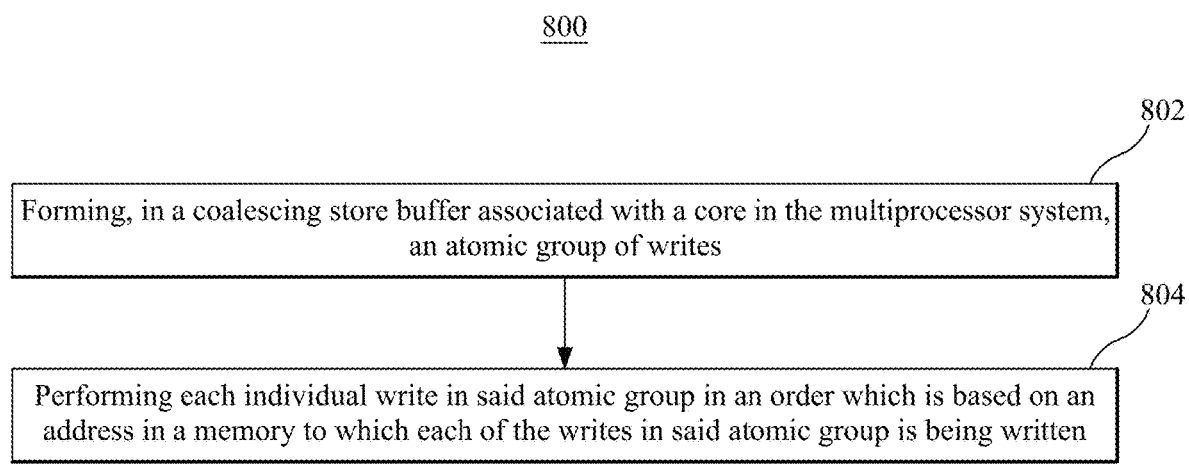
FIG. 8 is a flowchart illustrating a method of forming and writing atomic groups according to an embodiment.

Such embodiments can also be expressed as methods illustrated by flowcharts, such as flowchart 800 in FIG. 8. Therein, a method 800 for performing store buffer coalescing in a multiprocessor computer system, at step 802 forms, in a coalescing store buffer, an atomic group of writes and, at step 804, performs each individual write in said atomic group in an order which is based on an address in a memory to which each of the writes in said atomic group is being written.

The foregoing embodiments exhibit a number of beneficial qualities and characteristics as compared to conventional techniques. For example, some embodiments seamlessly support permission prefetching as early as possible, which is important for TSO performance. A prefetch to a locked line is NACK'ed and fails. Prefetching is safe, even if it happens in program order and does not deadlock. In contrast, permissions are demanded when the store buffer writes a cacheline in the cache. The method illustrated in FIG. 7 only blocks for permission demands that hit on locked cachelines.

According to some embodiments, no attempt is made to lock beforehand the permissions for all the cachelines in an atomic group. Instead, lock acquisition is incremental, cacheline-by-cacheline, and only when a cacheline is written. This provides flexibility and scalability. In contrast, some prior approaches aim to lock all permissions at once which necessitates either a centralized authority or roll-back.

According to some embodiments, on a conflict, already acquired permissions are not relinquished. In contrast, speculate-and-rollback approaches give up all permissions and essentially set they system back to its state pre-conflict. The difference here is vulnerability to livelock. As will be appreciated by those skilled in the art, a "livelock" condition is similar to a deadlock, except that the states of the processes involved in the livelock constantly change with regard to one another, none progressing.

According to some embodiments, if two atomic groups have multiple conflicting cachelines, they will conflict only on the cacheline with the minimum common address.

Thus, as described above, embodiments, solve the long-standing problem of providing atomicity to stores that straddle two cache lines, by creating an atomic group of the two cachelines when such situations are detected. This solution holds even when a store straddles the boundary of a sub-address lex order. Sub-address order is discussed in more detail below.

Additionally, while one embodiment of the method shown in FIG. 7 is O(n!) for an atomic group of size n, other embodiments are O(n) as discussed below. To summarize how embodiments impact store commands: deadlock in getting permissions and locking cachelines (assuming no other resource restrictions for now) is avoided by, according to one embodiment, using ascending address order as the write order for a group of atomic writes and livelock is avoided because: i) embodiments do not roll-back on conflicts; and ii) conflicting requests are delayed and satisfied in order when the writing of the atomic group completes.

As described above, holding all permissions is useful to guarantee atomicity for writes but it should be noted that this functionality also satisfies atomicity with respect to loads. According to embodiments, a cacheline is locked only at the moment it is written as part of an atomic group. Prior to being locked the cacheline is available for reads. Even if a load is in conflict with one of the stores in an atomic group, the load is allowed to read the old value if the new value has not been written yet, which is correct for the TSO model. As far as the core that has issued the load is concerned, none of the stores in the atomic group are visible, even though some cachelines may already have been written.

However, if a conflicting load tries to access a locked cacheline (i.e., a new value) written by an atomic group, then the conflicting load is stalled until the whole atomic group finishes. This guarantees that the stores in the atomic group cannot be observed out-of-order by a racing core.

Figure 9A:
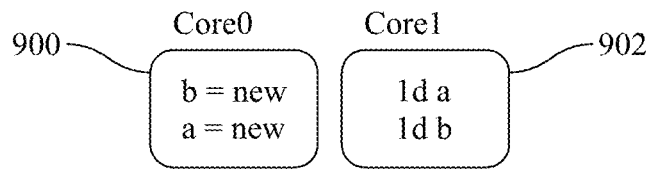
FIGS. 9A-9C illustrate how loads are handled in a multiprocessor system according to an embodiment.
Figure 9B:
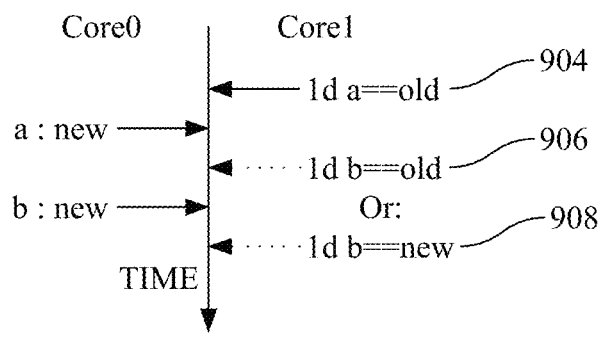
Figure 9C:
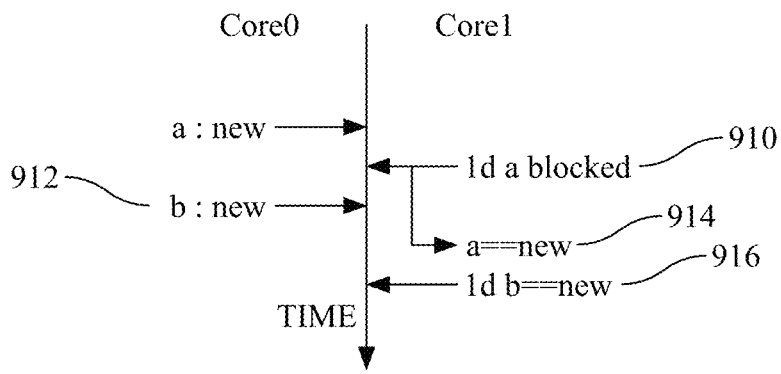

Consider the example in FIGS. 9A-9C. In FIG. 9A, the code 900 executes store (st) b and st a in Core0 and the code 902 executes the respective loads (lds) in the opposite order in Core1. TSO is violated if ld a sees the new value and ld b sees the old value. Note, however, that employing the aforedescribed embodiments and applying the lex order to determine when the stores are performed, reverses the order that the stores are performed in the memory system. If ld a 904 reads cacheline a before it is written (i.e., the case illustrated in FIG. 9B), then Core1 gets the old value and it does not matter what value ld b sees (either new 908 or old 906, depending on the interleaving, is fine with TSO). If, on the other hand as shown in the case illustrated in FIG. 9C, ld a attempts to read the new value of a, Core1 will be stalled 910 until b is also written 912, 914. Stalling ld a at 910 delays ld b 916 in Core1 on account of TSO's load→load order. If ld b executes speculatively, before ld a completes, it will be squashed (to preserve TSO) when b is written by Core0 and eventually see the new value. The end result is that if ld a is bound to see the new value of a, its completion after the writing of the atomic group ensures that ld b will also see the new value of b, as required by TSO.

To summarize how embodiments impact load commands: delaying loads (until the writing of stores completes) does not cause a deadlock as long as it is guaranteed that the writing of stores will complete. Stores can only be delayed by conflicting stores. But, as described above, write conflicts among atomic groups cannot deadlock and prevent the completion of stores. From this perspective, both loads and stores cannot be prevented from completing. Livelock is avoided because conflicting loads are just delayed for the duration of the atomic group write. In one embodiment, stalled read requests are satisfied (in order) at the end of the atomic group write and before a new one begins.

The aforedescribed embodiments illustrate how using the address as the lex order solves the write-and-lock deadlock for atomic group writes, assuming no other resource restrictions. The requirement to hold on to all locked cachelines until an atomic group write is finished, however, introduces resource-conflict deadlocks at various points in a real system. The two types of deadlocks that can appear in various structures in the memory hierarchy are due to intra-group conflict in private structures and/or inter-group conflict in shared structures, each of which are described below.

Regarding intra-group conflict in private structures: elements of the same atomic group cannot be accommodated together. The example here is the cache associativity deadlock. Embodiments should be able to write and hold on to all permissions of the cachelines in an atomic group simultaneously. If several elements of an atomic group map to the same cache set and their number exceeds the associativity of the set, the algorithm described above with respect to FIG. 7 deadlocks. In general, a deadlock avoidance mechanism cannot simply rely on increasing associativity (e.g., with the addition of a fully associative victim cache) as this only makes the deadlock more unlikely, but not impossible. Note, here, that the resource conflict does not concern reads (loads), as the inability to evict means that read will be delayed until the atomic-group write completes- or the read will be performed as uncacheable.

Regarding inter-group conflict in shared structures: elements of different atomic groups deadlock contenting for a shared resource. The example here is the directory-eviction deadlock (or, analogously, an LLC-eviction deadlock but for simplicity the directory is used herein to stand in for the general case of a shared structure). Embodiments should be able to hold all the permissions of an atomic group simultaneously but some other atomic group interferes at the directory. If two atomic groups need to allocate new directory entries but they are prevented by each other, they deadlock. This happens when each atomic group already occupies the contested directory entry needed by the other atomic group, and will not let go. A directory eviction must invalidate the writer. But if the writer has locked its cacheline it will not respond until the end of the atomic group write in progress.

Figure 10:
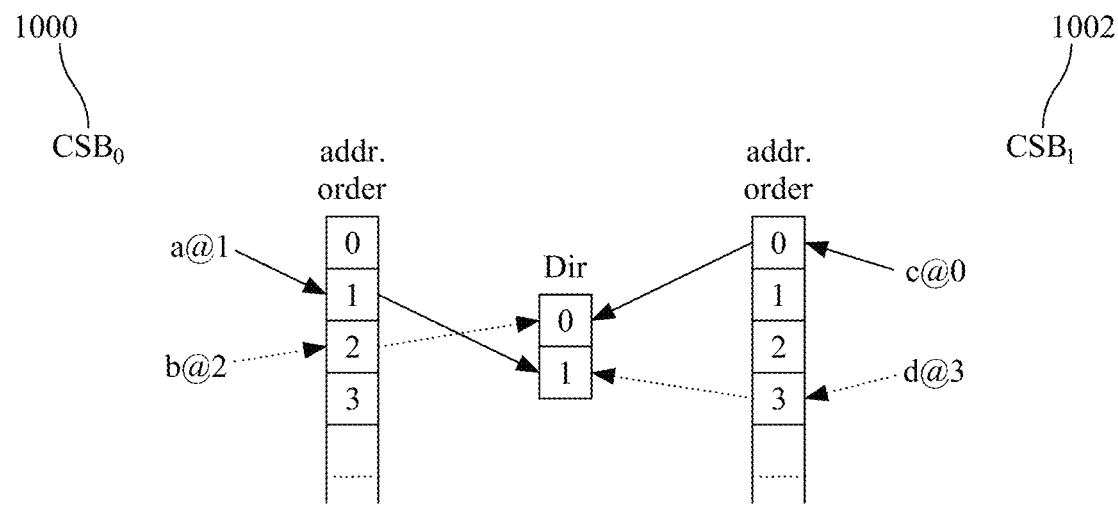
FIG. 10 shows an example of a directory-eviction deadlock situation.

FIG. 10 shows an example of this directory-eviction deadlock situation. Therein, CSB0 1000 and CSB1 1002 attempt to write their atomic groups: {a, b} and {c, d} respectively to shared directory 1004. The atomic groups have no cachelines in common and should not conflict in their writes. CSB0 1000 first writes a with address 1 to directory 1004 and then attempts to write b with address 2 to directory 1004. CSB1 1002 first writes c with address 0 to directory 1004 and then attempts to write d with address 3 to directory 1004. Moreover, assume that directory 1004 is a direct-mapped directory with just two entries (i.e., an index of one bit). The topmost entry of the directory (index 0) is occupied by c and the bottom entry (index 1) by a. Because a and c are locked in the respective caches the directory entries cannot be evicted. This is a deadlock. The CSBs 1000 and 1002 cannot write b and d, respectively, and cannot finish their atomic writes.

The reason for this deadlock is that the order in which two (or more) atomic groups allocate entries in the directory deadlocks. In other words, the lex order maps in such a way to the directory structure so that elements that would be stored in lex order contend for the same positions but in a deadlocking order. This resource conflict does not concern reads (loads) even when they can be blocked by an atomic group write. This is because if a read needs to allocate a directory entry, the write of that cacheline in the atomic group has not happened yet. The read gets the old value from memory, regardless of whether it can allocate a directory entry or not. On the other hand, if a read blocks waiting for an atomic group, then it is using a directory entry already allocated by the write to the cacheline by the atomic group, and thus is covered by the discussion above.

One of the features of the aforedescribed embodiments is a system-wide lex order that is deadlock-free for both write conflicts and resource conflicts for all the cache structures in the system, private (e.g., L1, L2) or shared (e.g., LLC, directory). To ensure this performance, it is not sufficient to write coalesced stores in lex order (i.e., the allocation problem illustrated in FIG. 10), instead another constraint is added according to embodiments: a constraint associated with how atomic groups are formed which resolves the allocation associated deadlock problem. By limiting the size of atomic groups, the allocation problem described above can be resolve which, in turn, can be performed by using only a portion or subset of the entire address value to determine the lex order as will now be discussed below.

Consider first direct-mapped private structures, e.g., a direct mapped cache memory. Clearly two elements of an atomic group that map to the same position in the direct-mapped array, cannot be accommodated. Embodiments solve this problem by demanding that two distinct items in an atomic group cannot map to the same position. This means that, for a single direct mapped private memory structure, the largest size lex order that embodiments can use to order the items in an atomic group is the index of that direct-mapped array, so that:

$$\text{lex rank} = \text{addrcacheline} \% \text{ index} \quad (1)$$

Having introduced now the term "lex order" and also "lex rank", consider the following to understand the relationship between these two terms in the context of the embodiments described herein. Lex order refers to the order that embodiments use to write cachelines in an atomic group to memory. For example one lex order can be ascending address; another is descending address. Other lex orders were described above. By way of contrast, the lex rank of an address is the rank of the address (as a numerical value) in the specified lex order. For example, the lex rank of address 1 in an ascending lex order (using the full address) is 1. The lex rank of address 1 in a descending lex order is MAX−1. Thus, the "lex rank" of a single item (i.e., cacheline or address) specifies the order of that single item. Additionally, lex rank is an identifier which identifies those cachelines that can be included in a same atomic group, i.e., those cachelines having a same value of lex rank cannot be coalesced into a same atomic group, those having different values of lex rank can. Thus equation (1) sets the lex rank of a given cacheline as the result of its physical address value modulo the index of the direct mapped array, in this embodiment. The implication of equation (1) in the context of embodiments described herein is that an atomic group cannot accommodate distinct cachelines with the same lex rank in lex order because the system cannot order such cachelines in a manner which will guarantee avoiding the allocation problem described above with respect to FIG. 10 and deadlock conditions.

Thus the following describes forming atomic groups in sub-address order according to embodiments, i.e., limiting those cachelines which can be part of a given atomic group. Each time the store buffer receives a new cacheline whose lex rank clashes with the lex rank of another cacheline already in the store buffer—a lexicographical order conflict—the system will start a new atomic group for the new cacheline and stop coalescing. According to embodiments, coalescing is not allowed between the new cacheline and any cacheline in the "clashing" atomic group. Attempting otherwise would bring the two cachelines into the same atomic group. Transitively, the new cacheline is not allowed to coalesce with any atomic group that is older than the clashing atomic group. The clashing (rank-conflicting) atomic group in the store buffer turns into a coalescing barrier and prevents any further coalescing for itself and all older atomic groups. This is a new condition that enters into force with respect to the method for forming atomic groups according to embodiments, relative to the method for forming atomic groups described above with respect to FIGS. 5A-5C.

Figure 11:
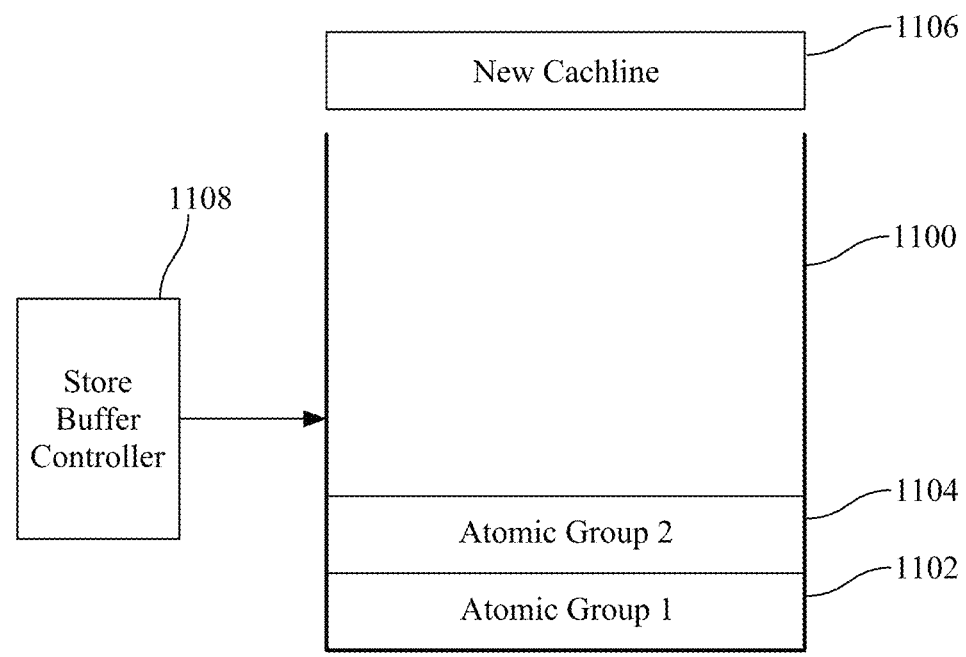
FIG. 11 illustrates a store buffer with two coalesced atomic groups at a time when a new cacheline is introduced to the store buffer.
Figure 12:
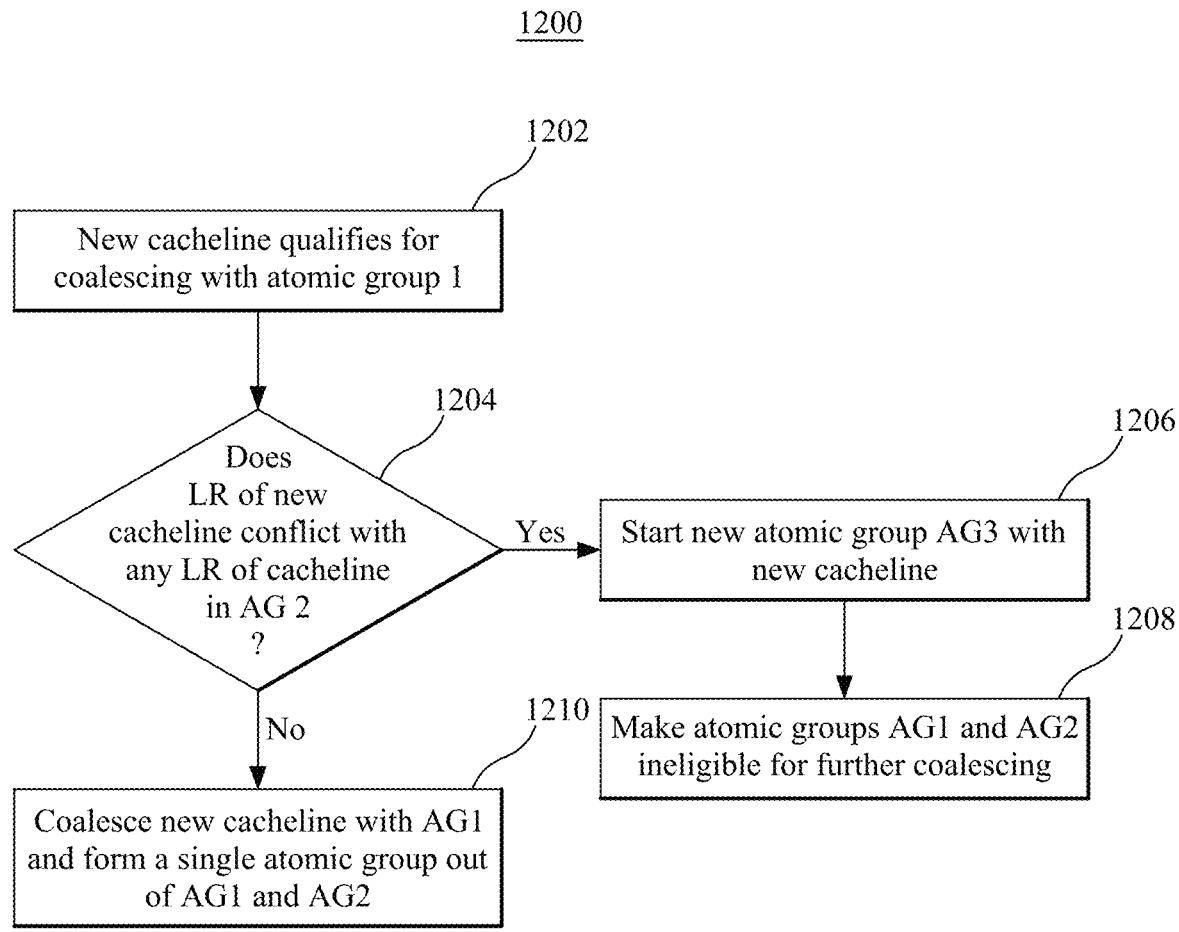
FIG. 12 is a flow diagram illustrating how the new cacheline of FIG. 11 is handled relative to the existing atomic groups according to an embodiment.

To further illustrate how atomic groups are formed according to some embodiments, consider the following example with respect to FIGS. 11-12. FIG. 11 shows a coalescing store buffer 1100 at time T1 having a first (older) atomic group 1102, and a second (newer) atomic group 1104. Applying the principles of the embodiments discussed above for forming atomic groups, it should be expected that the cachelines in each atomic group 1102 and 1104 would have the following characteristics: (1) all of the cachelines in each atomic group will have a memory address within a range established by the smallest memory structure's index, and (2) all of the cachelines in each atomic group will have a different lex rank. At time T1, a new cacheline write 1106 is introduced into the store buffer 1100, which satisfies the general requirements (discussed above with respect to FIGS. 5A-5C) to be coalesced into atomic group AG1, 1102 as shown by step 1202 in flowchart 1200 of FIG. 12. However, suppose that in this example, at step 1204, the new cacheline 1106 is determined to conflict with (i.e., have a same lex rank as) a cacheline which is already part of atomic group 2, AG2, 1104. Under those circumstances, the flow follows the "YES" path of flowchart 1200 and a new atomic group 3, AG3, is started at step 1206, including the new cacheline 1106. Additionally, the system will make atomic groups 1 and 2 ineligible for further coalescing, i.e., no more writes will be added to these atomic groups once cacheline 1106 is determined to conflict with a cacheline in atomic group 2. Otherwise, if the cacheline 1106 does not have a lex rank that conflicts with those of the current members of atomic group 2, AG2, 1104, then, at step 1210, the new cacheline 1106 will coalesce with the respective cacheline in AG1, 1102, and atomic group AG2, 1104, and atomic group AG1, 1102, form a single atomic group encompassing all their prior members. The steps illustrated in FIG. 12 can be controlled/performed by control logic circuits of the store buffer represented by store buffer controller 1108 in FIG. 11.

The foregoing describes an embodiment associated with a direct-mapped private memory structure, however it will be appreciated that similar techniques can be applied to embodiments involving other memory structures, e.g., set associative private structures. In a set associative private structure, a set can only accommodate up to assoc items, where assoc is its associativity. The number of candidate cachelines that can occupy these assoc positions in a set is of course much larger. If an atomic group is to be restricted so that it does not contain more than assoc items that can map to the same set, the lex order that is used can be at most assoc×index in size. In other words, such embodiments add to the lex order log 2 assoc bits from the address for a total of log 2 assoc+log 2 index, so that:

$$\text{lex rank} = \text{addr}_{cacheline} \% (\text{index} \times \text{assoc}) \quad (2)$$

Of course, if the associativity of the memory structure is not a power-of-two, then the next lower power of two is selected. For example, in a 4-way set-associative cache the lex order is 4 times larger than the index. This guarantees that at most 4 elements from the same atomic group can map to the same set, eliminating any chance for a conflict.

Note, that these embodiments do not restrict what can possibly go in a cache set or in the store buffer. The cache and the store buffer work as before except as described herein. Embodiments only restrict the formation of atomic groups in the store buffer and consequently the order in which the contents of the store buffer are written to the cache.

Figure 13:
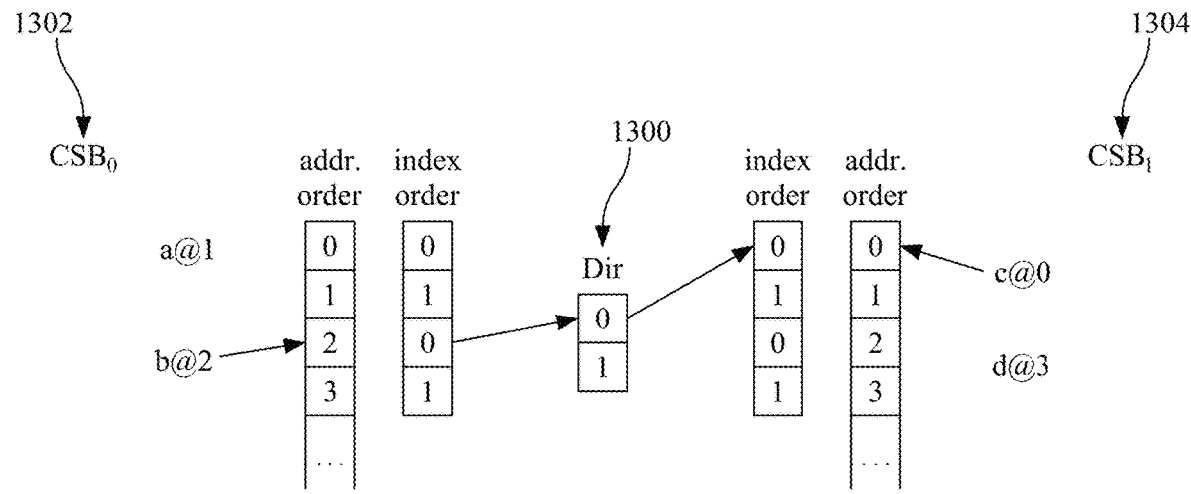
FIG. 13 shows how index order solves the directory-eviction deadlock situation according to an embodiment.

The foregoing describes application of embodiments to private memory structures, however other embodiments can also be applied to shared memory structures. FIG. 13 shows how index order solves the directory-eviction deadlock of FIG. 10. This embodiment uses the directory's one-bit index (index$_{dir}$) as the lex order for the atomic group writes, instead of the address order that was used in FIG. 10. Writes from different atomic groups conflict on the allocation of a directory entry only if they are of the same rank in lex order. This condition is referred to herein as "lexicographical eviction". For example, in FIG. 13, only one of cacheline b or cacheline c, which have a rank of 0, can be the first to allocate the directory entry 0.

Assume now that cacheline b is first to be written in the entry 0 of directory 1300. If cacheline c tries to evict b, it must send an eviction invalidation to the cached copy of b. This eviction invalidation reaches Core0 1300 and will be considered by the method in FIG. 7 in the same way as any other write conflict, i.e., an invalidation due to another core writing the same address b. If b is locked in the L1 of Core0 1300, the invalidation has to wait; otherwise, the cacheline is invalidated and the directory entry can be replaced by c. The winning store buffer is the one that first gets the directory entry and manages to write-and-lock its cacheline. The losing store buffer, in this case CSB1/Core1 1304, has to wait for the eviction until the winning store buffer finishes writing its atomic group.

Having described lexicographical eviction in a direct-mapped memory structure, the discussion is now extended to a set-associative directory by using a sub-address lex order. According to an embodiment, the largest size lex order that guarantees no deadlock is: index$_{dir}$×assoc$_{dir}$. In this lex order, a single atomic group can claim up to assoc$_{dir}$ entries in a set. Two or more atomic groups can collectively fit up to assoc$_{dir}$ entries, non-conflicting in lex order. To deadlock, one atomic group must try to fit one more entry (which would require an eviction). But the lex order guarantees that this new entry must conflict in rank with an entry already present in the set (pigeonhole principle). The new entry must evict the old with the same rank (lexicographical eviction)— not any other replacement victim, e.g., not necessarily the least recently used (LRU) entry. As we explained above for the direct-mapped directory, this eviction will be correctly handled by the method in FIG. 7.

To better understand the principles associated with the foregoing embodiments, a more concrete example of how to implement such embodiments in a system having private caches (private L1 and L2 per core) and shared structures (LLC and directory) will now be described. As will be appreciated by those skilled in the art, a write may need to visit all these structures. The largest, system-wide lex order that guarantees deadlock-free passage through all these structures is the minimum index$_i$×assoc$_i$ of all the structures i=0 . . . n in the system, so that:

$$\text{lex rank} = \text{addr}_{cacheline} \% \min(\text{index}_i \times \text{assoc}_i) \quad (3)$$

TABLE I

Lexicographical order in an example system

| Structure (Size) | Index ($\log_2$) | Assoc ($\log_2$) | Index × Assoc ($\log_2$) |
|---|---|---|---|
| L1 (32 KB) | 64 (6) | 8 (3) | 512 (9) |
| L2 (128 KB) | 256 (8) | 8 (3) | 2048 (11) |
| LLC (8 MB) | 16384 (14) | 8 (3) | 131072 (17) |
| Dir (32K-entries) | 4096 (12) | 8 (3) | 32768 (15) |

As an example of how to apply equation (3) in a multiprocessor system, consider the configuration that is shown in Table I above (which is also the configuration used in simulations of an embodiment discussed below with respect to FIGS. 15A-15E). Therein it can be seen that four different types of memory structures are used by the system (L1 cache, L2 cache, LLC and a directory) of varying sizes. However, according to the embodiments described above the maximum size of the lex order is determined by the smallest structure, i.e., the L1 cache and is thus 512 or $2^9$.

The size of this lex order is 16 times smaller than the index of the LLC and four times smaller than the index of the directory. In these two structures, any item that maps to the same set has the same lexicographical rank. Therefore, replacement in the shared structures is free to follow any desired replacement policy. The shared structures are not turned into direct-mapped structures on account of the lexicographical eviction.

In general, it can be assured that in any practical system implementation made in accordance with these embodiments, the shared structures will not be limited by lexicographical eviction, as the lex order is defined by the minimum-size private structure, which is the L1. If the lex order is at most as large as the index of a shared structure, the shared structure's associativity is not constrained. It is only when the lex order is larger than the index (and items of different ranks map to the same set), the associativity is artificially constrained because of lexicographical eviction. By using the L1 size to set the lex order it is unlikely in practice that the lex order will be larger than the index of a shared memory structure in the multiprocessor for at least two reasons.

Figure 14A:
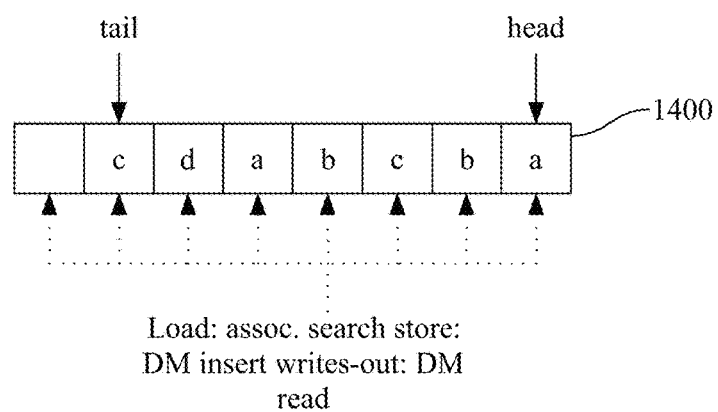
FIGS. 14A-14C depict various store buffer implementations.
Figure 14B:
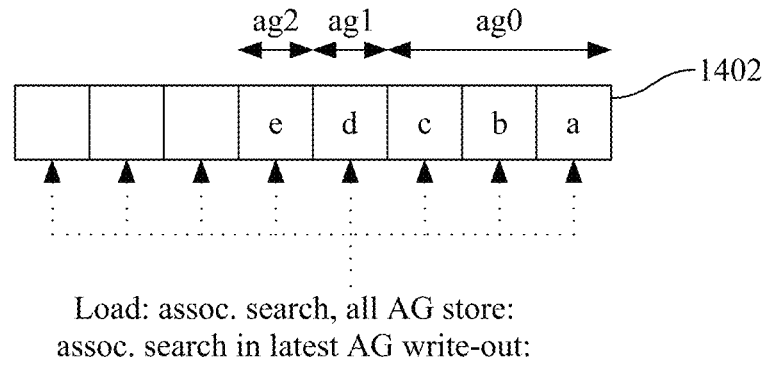

Having discussed various embodiments above, the discussion now returns to the impact of such embodiments on how coalescing store buffers can be architected to implement such embodiments. To begin, consider conventional non-coalescing TSO store buffers, an example of which is illustrated in FIG. 14A and discussed below.

In general, non-coalescing TSO store buffers are limited by the need to drain the store values in program order into the memory system. To satisfy this requirement, an age-indexed organization can be used, for example, a FIFO circular buffer 1400 with a head and tail pointer, where store-value entries are inserted in the tail and extracted from the head. With an age-indexed organization, allowing loads in their critical path to quickly search the store buffer, necessitates a content-addressable memory (CAM) functionality on address.

A line-coalescing store buffer (LSB) design simply replaces each individual store entry with a cacheline. Consecutive stores can coalesce only in the last-in cacheline. FIG. 14A shows a conventional 8-entry line-coalescing SB as a circular buffer that also doubles as a single 8-way associative set (CAM). Time and energy constraints come from the following operations:

Store-insert: Stores insert values in a direct-mapped fashion (in the entry pointed by the tail pointer).

Load-search: Loads search the buffer associatively as an 8-way set, looking for the youngest match, i.e., the associative search is prioritized by the position in the circular list.

Write-out: The entry at the head of the SB (direct-mapped) is written out.

However, a circular buffer/CAM implementation such as that illustrated in FIG. 14A faces significant challenges because of cost, latency, and energy considerations, which translate in store buffers of limited size. By way of contrast, consider the coalescing store buffer implementations illustrated in FIGS. 14B and 14C that are made possible by the above-described embodiments associated with storing coalesced writes in lexicographical order and forming atomic groups that are limited in size based, at least in part, on the smallest memory structure's size (and associativity). A coalescing store buffer (CSB) implemented in accordance with such embodiments changes the requirements for the organization. As discussed above, the considerations that are significant for a CSB architected in accordance with the embodiments include: i) the age order of the atomic groups, and ii) the lex order of the addresses within an atomic group. A first such CSB organization is a fully-associative organization (CAM) shown in FIG. 14B. In this organization 1402 an atomic group spreads across the associativity dimension (e.g., ag0 with a, b, and c). As with the memory organization 1400, each entry can be associatively matched on address. However, unlike LSB memory organization 1400, for CSB 1402 an extra field, the atomic group ID (agID), requiring an extra $\log 2(SB_{size})$ bits per entry, is used for prioritization of the atomic groups.

Store-insert: Stores search for the youngest same-address entry for coalescing. If no match is found, or if a lexicographical conflict is detected in-between, the store is inserted (direct-mapped) at the tail pointer. Otherwise coalescing takes place on the matched entry and tagging of the store buffer entries with new agIDs is performed as described above, off the critical path.

Load-search: Loads search the buffer associatively as an 8-way set, looking for the youngest match; the search is also prioritized by the position in the circular list.

Write-out: Select the entries of the oldest atomic group (agID); sort on sub-address lex order—sub-field of the address tag—using a priority encoder tree or other similar techniques.

The CSB organization 1402 of this embodiment is well suited for small (e.g., 8-entry) CSBs and provides significant coalescing. It is slightly more expensive in time and energy for the store-insert and the write-out operations (which are not time-critical) than the LSB 1400 but it is the same as the LSB 1400 for the load-search. The increase in time and energy over the corresponding LSB operations is negligible with respect to the resulting difference in writes to the L1.

Figure 14C:
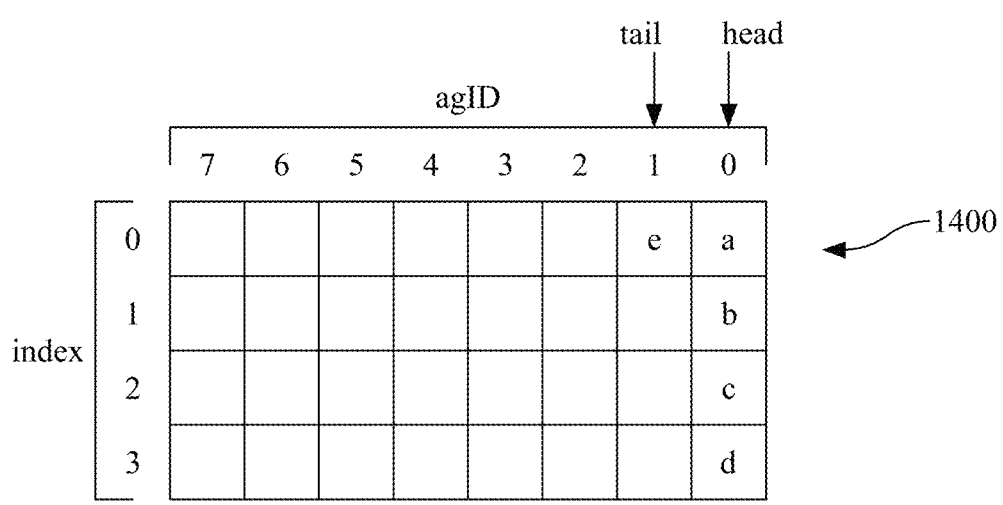

Looking now at FIG. 14C, this figure illustrates what is referred to herein as a "lexicographical CSB organization" 1404. Recalling that FIG. 1 shows that, for the workloads examined therein, small to medium-sized store buffers (e.g., 8 to 32 entries) can capture the majority of the coalescing potential. However, if need be, for workloads that are write-intensive and where fast store propagation does not play a major role in performance then the alternative organization 1404, which is based on lex order, makes the CSB efficient and scalable. The key notion here is that while an LSB 1400 cannot be scaled (except in associativity which is the expensive dimension) the CSB 1404 can be scaled in the number of sets (which is the indexed dimension).

In the CSB 1404, each associative way become a separate atomic group. The policy of forming atomic groups operates as discussed above with respect to FIG. 12 to add as many stores as possible to the same atomic group (e.g., a to d in ag0). Each way (atomic group) is a direct-mapped buffer already sorted in lex order. As described above, the CSB 1404 is forced to start on a new atomic group only when a lexicographical conflict is identified (e.g., e with a in FIG. 14C). In this model:

Store-insert: direct-mapped, current atomic group (way), indexed by lex order.

Load-search: associative on the set indexed by lex order.

Write-out: direct-mapped based on a traversal of a single (oldest) associative way.

This organization addresses the need for large, scalable store buffers when the need arises. However, as stated above, the CSB 1402 provides sufficient benefits for smaller workloads where significant benefits may not be achieved by increasing the size of the store buffer (e.g., a large portion of the potential for coalescing in some workloads is covered with few entries, see FIG. 1).

Control policies for coalescing store buffers have been studied previously. An occupancy-based approach allows some time for coalescing but starts draining the store buffer when a high water mark is reached. In the embodiments described herein, the high water mark puts a limit on how large an atomic group can grow before writing it out. The disclosed embodiments can use any occupancy-based policy with a high water mark and optionally be enhanced with a time-out (to ensure progress if the high water mark is not reached).

In order to evaluate the efficacy of the embodiments described herein, simulations of such architectures were performed, results of which are illustrated in FIGS. 15A-15F. These simulations modeled operation of a multicore processor consisting of 8 out-of-order cores and is based on the cycle-accurate GEMS simulator for multicore systems, which offers a timing model of the memory hierarchy and the cache coherence protocol. A detailed x86-like in-house out-of-order processor model driven by a Sniper front-end has been incorporated into GEMS. The processor model used for this simulation implements a fully pipelined (both reads and writes) L1 cache with next-line prefetching. The interconnect is modeled with GARNET. The architectural details of the simulated system are displayed in Table II below.

TABLE II

| System configuration | |
|---|---|
| Processor | |
| Issue/Commit width | 4 instructions |
| Instruction queue | 60 entries |
| Reorder buffer | 192 entries |
| Load queue | 72 entries |
| Store queue + store buffer | 42 entries |
| Memory | |
| Private L1 I&D caches | 32 KB, 8 ways, 4 hit cycles, pipelined |
| Private L2 cache | 128 KB, 8 ways, 12 hit cycles |
| Shared L3 cache | 1 MB per bank, 8 ways, 35 hit cycles |
| Directory (8 banks) | 512 sets, 8 ways (200% coverage) |
| Memory access time | 160 cycles |
| Network | |
| Topology | Fully connected |
| Data/Control msg size | 5/1 flits |
| Switch-to-switch time | 6 cycles |

The simulations run the PARSEC 3.0 applications, with simsmall (freqmine, streamcluster, swaptions, and vips) and simmedium (blacksc-holes, bodytrack, canneal, dedup, ferret, fluidanimate, and x264) inputs, and present results for their region of interest. Four SQ/SB configurations are modeled (only three of which are graphed in FIGS. 15A-15F), which are referred to herein as NSB, LSB, CSB-TSO and CSB-RC. The CSB-TSO results reflect results associated with the embodiments described herein. The ungraphed SQ/SB configuration is a non-coalescing, unified SQ/SB (NSB), similar to the one implemented in Intel processors, which is used as the baseline on which the results are normalized. The other three (graphed) configurations employ separate structures to allow coalescing. LSB (line-based), such as LSB 1400 in FIG. 14A, coalesces in the last cacheline if there is a match. These store buffers do not violate TSO. CSB-TSO (based on lexicographical order), such as CSB 1402, and CSB-RC (coalescing, release consistency) allow coalescing to non-consecutive lines. CSB-RC, however, performs the writes in any order thus relaxing TSO. For every configuration, the total number of SQ+SB entries is 42. This restriction is imposed by the requirement to perform an associative search of both structures on every load to ensure proper store forwarding. The SQ and the unified SQ/SB of the baseline configuration have 32-byte entries and the coalescing store buffers in LSB, CSB-TSO, and CSB-RC have 64-byte entries. The simulations illustrate energy consumption for the SQ, SB, and L1 cache with CACTI-P [24] for a 22 nm process technology, as well as overall execution time.

With these simulation configuration details in mind, the sensitivity analysis for execution time and energy consumption (both averages over all benchmarks) with respect to the SB size is shown in the graphs of FIGS. 15A-15F. In all graphs, the x-axis represents the number of entries in the SB. On each graph, four policies for the draining of the store buffer are plotted: i) Start draining when a second entry is inserted in the SB (and no more coalescing is possible in the LSB), i.e., a high water mark of 2 entries. ii) Drain with a high water mark of half the entries in the SB (n:2). iii) Drain with a high water mark of three quarters of the entries in the SB (3n:4). iv) Drain when the SB is full (n). For LSB, a high water mark larger than 2 degrades performance (since there are no extra coalescing opportunities). For CSB, larger high water marks are beneficial as they increase coalescing. For the purposes of this evaluation a high water mark of 2 for LSB and n:2 for CSB is employed.

Figure 15A:
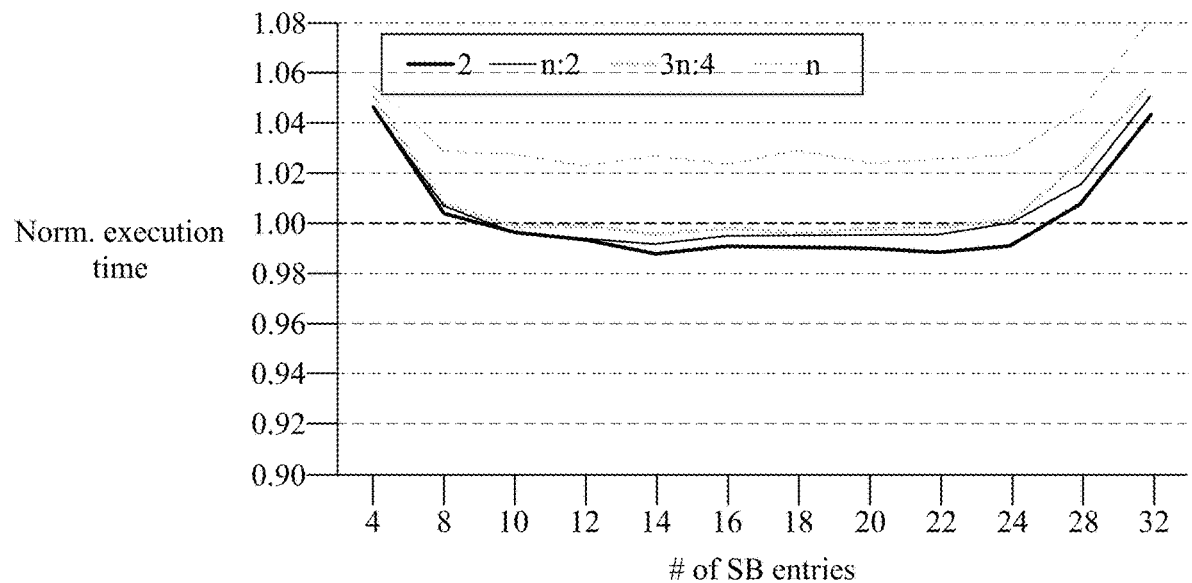
FIGS. 15A-15F show various simulation results.
Figure 15B:
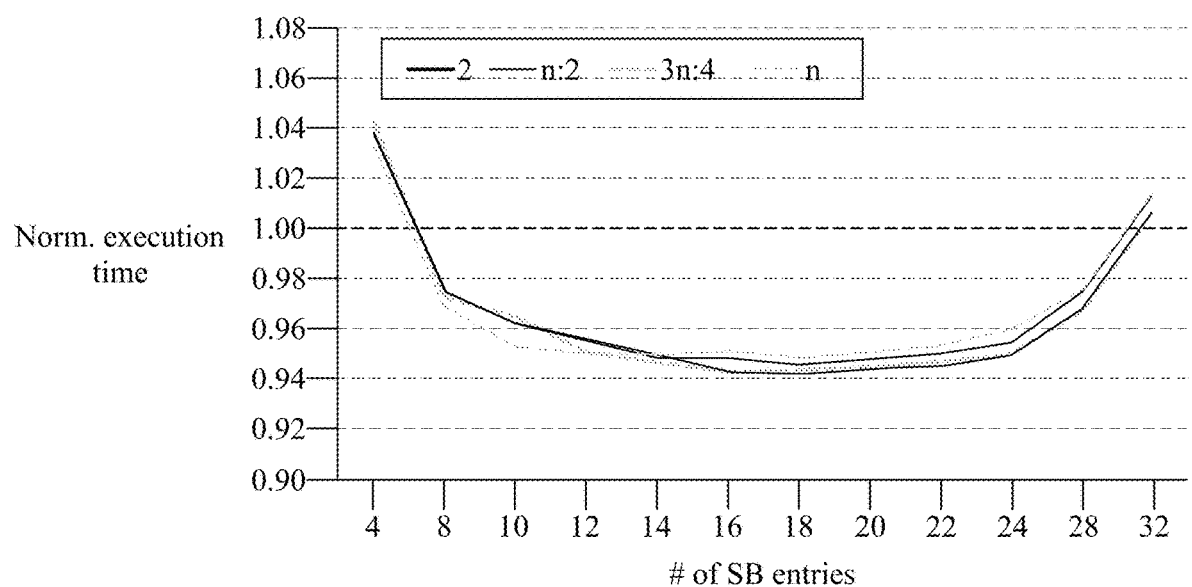
Figure 15C:
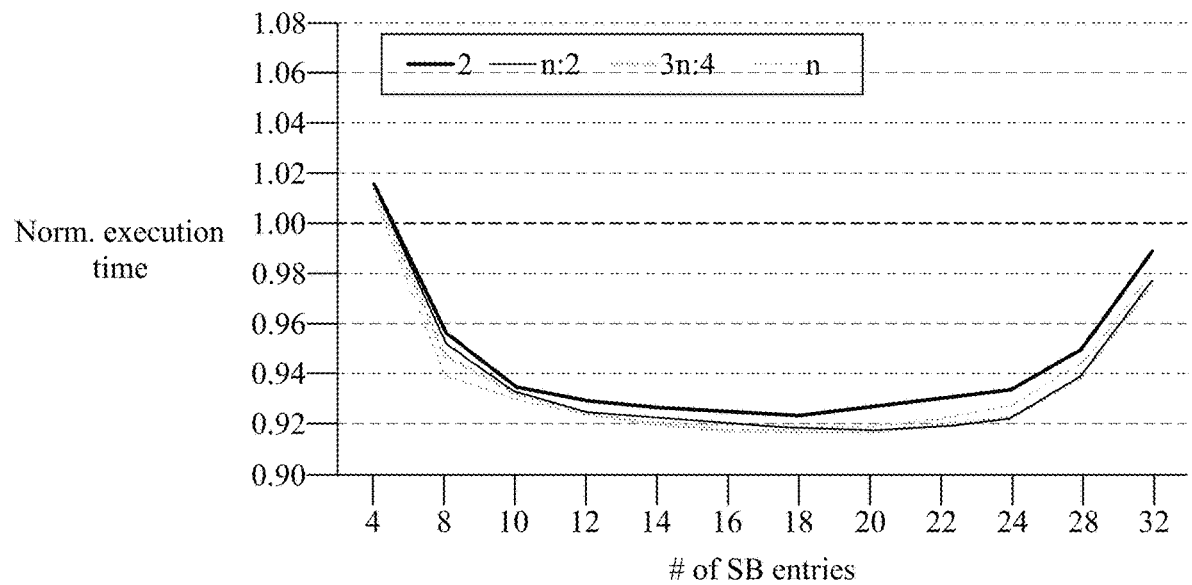

FIGS. 15A, 15B and 15C depict execution time results (normalized to the NSB results) for the LSB, CSB-TSO and CSB-RC, storage buffer configurations, respectively. Overall, for execution time the following observations can be formed. For the execution times using a conventional LSB (FIG. 15A), a very small SQ or SB increases the number of processor stalls and therefore execution time. By way of contrast, CSB-TSO (FIG. 15B) gains a significant advantage over LSB and approaches the performance of CSB-RC (FIG. 15C). An SB of 18 entries yields optimal results for separate queue implementations, yet even for this optimal number of SB entries, CSB-TSO significantly outperforms LSB in terms of execution time.

Figure 15D:
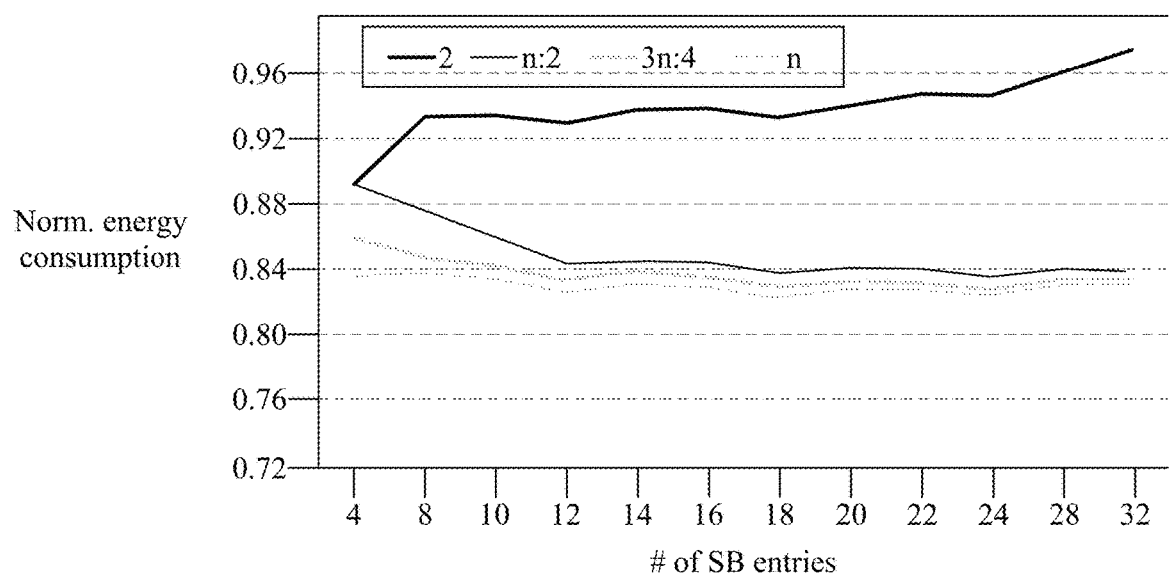
Figure 15E:
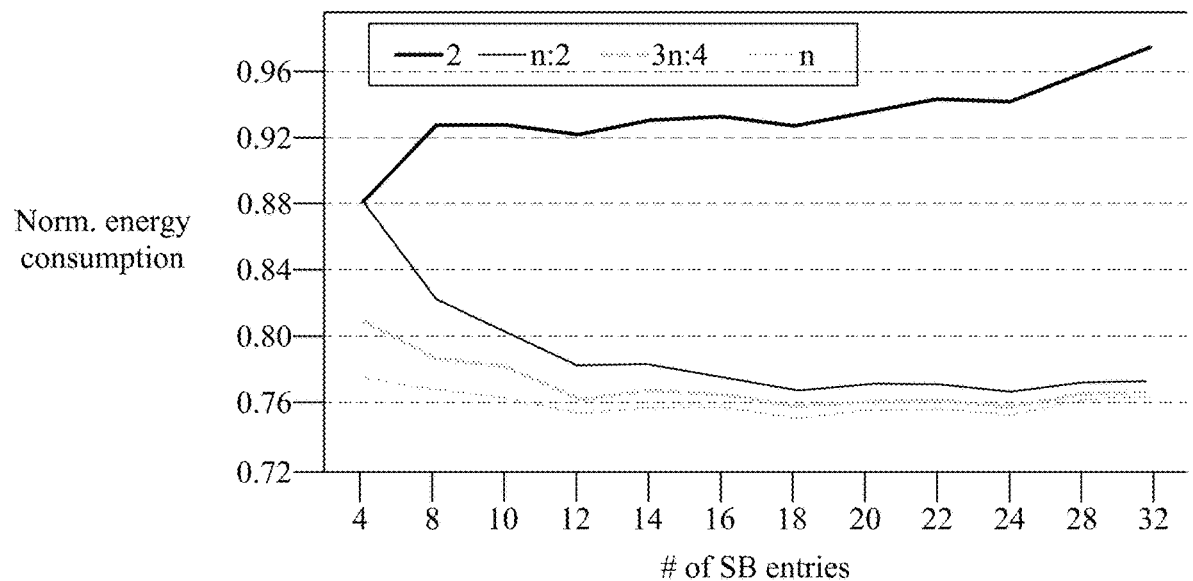
Figure 15F:
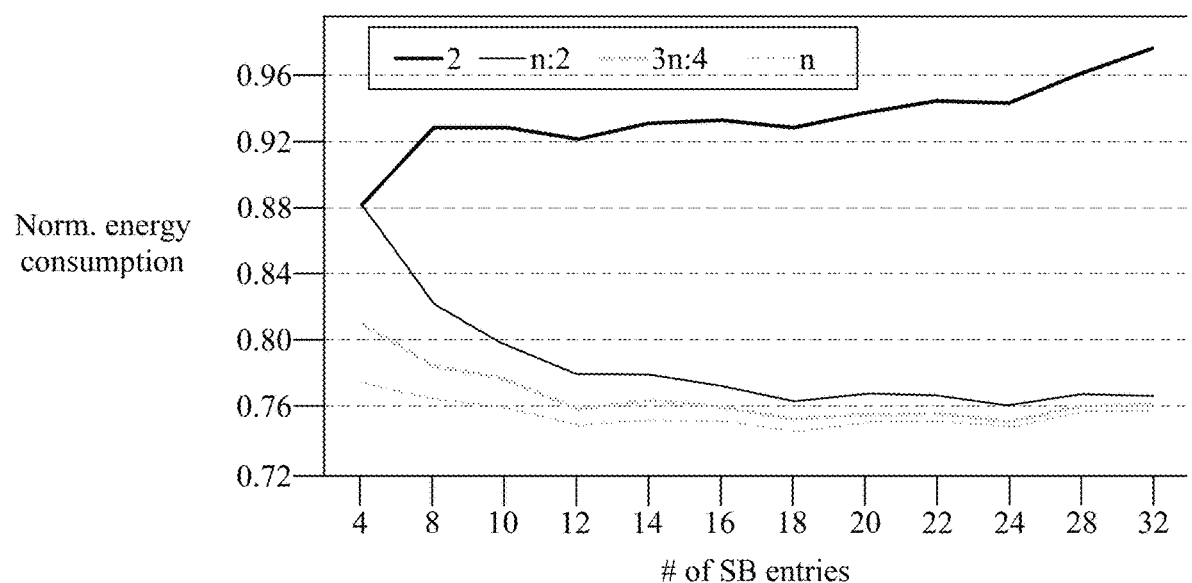

FIGS. 15C, 15D and 15F depict execution time results (normalized to the NSB results) for the LSB, CSB-TSO and CSB-RC, storage buffer configurations, respectively. Regarding energy consumption, results improve with SB size as more coalescing is taking place, but only up to the point where the coalescing potential of the applications is exhausted. Once again, comparing the three sets of graphs in these figures, it can be seen that CSB-TSO significantly outperforms LSB for 10 or more SB entries and approaches the performance of CSB-RC.

Some of the various embodiments described herein provide various benefits. For example, the disclosed deadlock-free and livelock-free systems and methods can: (1) non-speculatively (irreversibly) coalesce stores without needing to roll-back and atomically write a number of cachelines without the need of broadcast or centralized arbitration; (2) interleave at fine-grain (cacheline by cacheline) writes from conflicting atomic groups and prioritize on first conflict in lex order; (3) operate with cacheline transactions over an unmodified directory-based, cache-coherence protocol (e.g., directory-based MESI) and seamlessly accommodate permission prefetching; (4) be entirely implemented in the store buffer and L1 cache controller with minimal additional cost (1-bit per L1 cacheline); and (5) free the TSO store buffer from the need to preserve FIFO store order (program order) and allow direct-mapped or set-associative implementations, as a cache.

Although some of the embodiments present a non-speculative coalescing store buffer (CSB) for TSO, however the embodiments described herein are applicable to other techniques and systems where atomic writes are performed. For example, the embodiments apply to any situation where there is a need to perform an atomic group of writes. This includes but is not limited to: performing an atomic group of writes as directed by the program which may use facilities available in the processor architecture or other means not described herein to denote to the hardware a set of writes to be performed atomically at runtime.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multiprocessor system comprising:
multiple processor cores;
a memory system; and
multiple coalescing store buffers, each associated with a respective one of the multiple processor cores, for receiving store instructions from a respective processor core with store data to be written into said memory system;
wherein the store data are coalesced in blocks that correspond to a multitude of consecutive memory locations;
wherein a block written in the memory system, updates memory locations that correspond to memory locations of the store instructions that coalesced in said block with the corresponding store data;
wherein said multiple coalescing store buffers each form atomic groups of said store instructions by writing the resulting coalesced data blocks as an atomic group;
wherein each block within an atomic group is written to the memory system in an order which is a function of an address in the memory system to which that block is written.

2. The system of claim 1, wherein a data block in an atomic group corresponds to a plurality of writes directed to a cacheline in said memory system.

3. The system of claim 2, wherein the data block, from a time it is written in the memory system, prevents a cacheline, that is updated with the data of the block, from being written or read by any other core, until all data blocks of the same atomic group have been written in the memory system.

4. The system of claim 1, wherein the multiprocessor system has a memory consistency model which requires that it appears to enforce a program order of individual stores in memory.

5. The system of claim 4, wherein a composition of each atomic group in terms of the store instructions that coalesce their data in the blocks of the atomic group is such that store instructions whose program order is affected by coalescing are grouped in the same atomic group while the program order between any two store instructions belonging to different groups is maintained.

6. The system of claim 1, wherein a composition of each atomic group in terms of its blocks is such that it can fit entirely in any set-associative structure, direct-mapped, or fully-associative structure, that are needed to perform writes in the memory system of said multiprocessor system.

7. The system of claim 6, wherein the composition of an atomic group is determined based on a function of an index and an associativity of the smallest set-associative, direct-mapped, or fully-associative memory structure needed to perform writes in the memory system of said multiprocessor system.

8. The system of claim 1, wherein the order in which each block within an atomic group is written to the memory system is a function of a portion of a complete memory address.

9. A method for performing store buffer coalescing in a multiprocessor computer system, the method comprising:
forming, in a coalescing store buffer associated with a core in said multiprocessor system, an atomic group of writes; and
performing each individual write in said atomic group in an order which is a function of an address in a memory system to which each of the writes in said atomic group are being written.

10. The method of claim 9, wherein the atomic group of writes are a plurality of writes directed to a cacheline in said memory system.

11. The method of claim 10, further comprising:
preventing a same cacheline from being written or read by cores other than said core, while the atomic group of writes is being performed.

12. The method of claim 9, wherein the multiprocessor system has a memory consistency model which requires it to appear to enforce a program order of individual stores in memory.

13. The method of claim 12, wherein a composition of each atomic group in terms of store instructions that coalesce their data in the blocks of the atomic group is such that store instructions whose program order is affected by coalescing are grouped in the same atomic group while the program order between any two store instructions belonging to different groups is maintained.

14. The method of claim 9, wherein a composition of each atomic group in terms of its blocks is such that it can fit entirely in any set-associative structure, direct-mapped, or fully-associative structure, that is needed to perform writes.

15. The method of claim 14, wherein the composition of an atomic group is determined based on a function of an index and an associativity of the smallest set-associative, direct-mapped, or fully-associative memory structure needed to perform writes.

16. The method of claim 9, wherein the order in which each individual write of an atomic group write is performed in the memory system is a function of a portion of a complete memory address.

* * * * *